United States Patent
Zhou et al.

(10) Patent No.: US 12,209,963 B1
(45) Date of Patent: Jan. 28, 2025

(54) METHOD FOR DETECTING AFLATOXIN B1 CONTENT USING FLUORESCENCE ANALYSIS BASED ON OPTICAL SECTIONING

(71) Applicant: Lingnan Normal University, Zhanjiang (CN)

(72) Inventors: Guohua Zhou, Zhanjiang (CN); Yongmei Jia, Zhanjiang (CN); Peilian Liu, Zhanjiang (CN); Zhiguo Li, Zhanjiang (CN); Yuge Liu, Zhanjiang (CN)

(73) Assignee: LINGNAN NORMAL UNIVERSITY, Zhanjiang (CN)

( * ) Notice: Subject to any disclaimer, the term of this patent is extended or adjusted under 35 U.S.C. 154(b) by 0 days.

(21) Appl. No.: 18/752,739

(22) Filed: Jun. 24, 2024

Related U.S. Application Data

(63) Continuation of application No. PCT/CN2024/079820, filed on Mar. 4, 2024.

(30) Foreign Application Priority Data

Jul. 7, 2023 (CN) .......................... 202310835039.4

(51) Int. Cl.
*G01N 21/64* (2006.01)

(52) U.S. Cl.
CPC . *G01N 21/6428* (2013.01); *G01N 2021/6439* (2013.01)

(58) Field of Classification Search
CPC .................... G01N 21/6428; G01N 2021/6439
See application file for complete search history.

(56) References Cited

U.S. PATENT DOCUMENTS

| | | | | |
|---|---|---|---|---|
| 10,267,794 B2 * | 4/2019 | Kim | ...................... | C12N 15/115 |
| 11,781,186 B2 * | 10/2023 | Yang | ..................... | C12Q 1/6823 |
| | | | | 435/6.11 |
| 11,782,011 B2 * | 10/2023 | Zhang | ................ | G01N 27/3277 |
| | | | | 205/777.5 |

OTHER PUBLICATIONS

Chen et al., "Light-Induced Activation of c-Met Signalling by Photocontrolled DNA Assembly," Chem. Eur. J., Oct. 26, 2018, vol. 24, pp. 15988-15992; Epub Oct. 4, 2018.*
Jia et al., "Recent Development of Aptamer Sensors for the Quantification of Aflatoxin B1," Appl. Sci., 2019, 9/2364, pp. 1-17.*
Guo et al., "Aptamer-Based Biosensor for Detection of Mycotoxins," Front. Chem., 2020, vol. 8, pp. 1-19.*

* cited by examiner

*Primary Examiner* — Galina M. Yakovleva

(57) ABSTRACT

A method for detecting an AFB1 content using fluorescence analysis based on optical sectioning is provided, which relates to the field of biological detection technologies. The method includes steps for detecting the AFB1 content by using a fluorescence probe combination, which includes fluorescence probes aptamer and PC-strand. The nucleotide sequence of the aptamer is shown as SEQ ID NO: 1, and a FAM group is labeled at a 3' end of the nucleotide sequence shown as SEQ ID NO: 1. The nucleotide sequence of the PC-strand is shown as SEQ ID NO: 2, a TAMRA group is labeled at a 5' end of the nucleotide sequence shown as SEQ ID NO: 2, and a PC group is labeled between $10^{th}$ bp and $11^{th}$ bp of the nucleotide sequence shown as SEQ ID NO: 2. The method can achieve photosensitive detection of AFB1, with high detection sensitivity and strong specificity.

8 Claims, 16 Drawing Sheets

Specification includes a Sequence Listing.

SEQUENCE LISTING

```
Sequence total quantity: 4
SEQ ID NO: 1            moltype = DNA  length = 47
FEATURE                 Location/Qualifiers
source                  1..47
                        mol_type = other DNA
                        organism = synthetic construct
misc_binding            47
                        bound_moiety = FAM group
                        note = FAM group is carboxyfluorescein group
SEQUENCE: 1
gttgggcacg tgttgtctct ctgtgtctcg tgcccttcgc taggccc                47

SEQ ID NO: 2            moltype = DNA  length = 18
FEATURE                 Location/Qualifiers
source                  1..18
                        mol_type = other DNA
                        organism = synthetic construct
misc_binding            10^11
                        bound_moiety = PC group
                        note = PC group is phenolphthalein group
misc_binding
                        bound_moiety = TAMRA group
                        note = TAMRA group is tetramethylrhodamine group
SEQUENCE: 2
gggcctagcg aagggcac                                                18

SEQ ID NO: 3            moltype = DNA  length = 18
FEATURE                 Location/Qualifiers
source                  1..18
                        mol_type = other DNA
                        organism = synthetic construct
misc_binding
                        bound_moiety = TAMRA group
                        note = TAMRA group is tetramethylrhodamine group
SEQUENCE: 3
gggcctagcg aagggcac                                                18

SEQ ID NO: 4            moltype = DNA  length = 10
FEATURE                 Location/Qualifiers
source                  1..10
                        mol_type = other DNA
                        organism = synthetic construct
misc_binding
                        bound_moiety = TAMRA group
                        note = TAMRA group is tetramethylrhodamine group
SEQUENCE: 4
gggcctagcg                                                         10
```

METHOD FOR DETECTING AFLATOXIN B1 CONTENT USING FLUORESCENCE ANALYSIS BASED ON OPTICAL SECTIONING

CROSS-REFERENCE TO RELATED APPLICATION

This application claims priority to Chinese Patent Application No. 202310835039.4, filed on Jul. 7, 2023, which is herein incorporated by reference in its entirety.

TECHNICAL FIELD

The disclosure relates to the field of biological detection technologies, and more particularly to a method for detecting an aflatoxin B1 (AFB1) content using fluorescence analysis based on optical sectioning.

STATEMENT REGARDING SEQUENCE LISTING

The sequence listing associated with this application is provided in text format in lieu of a paper copy and is hereby incorporated by reference into the specification. The name of the XML file containing the sequence listing is 24051TBYX-USP1-SL.xml. The XML file is 9,175,956 bytes; is created on Jun. 7, 2024; and is being submitted electronically via patent center.

BACKGROUND

With a development of technology, living standards of people are increasingly improving, and requirements for food safety are becoming higher and higher. Aflatoxin is easy to be produced when food is not properly preserved in a process of production and storage, especially in crops such as corn, soybeans and their products that are prone to mildew. The aflatoxin has extremely strong toxicity and carcinogenicity, especially aflatoxin B1 (AFB1), which has been listed as a class I carcinogen by the World Health Organization (WHO). In order to ensure food safety, how to detect food toxin AFB1 by relevant detection technology has always been one of the topics discussed.

Detection methods for the AFB1 in the related art mainly include: a colorimetric method, a fluorescence method, an electrochemical method, a high-performance liquid chromatography (HPLC) method, a surface plasmon resonance method, and a novel fluorescent aptamer sensor. However, currently most biosensors with target recognition units are "passive", that is, a target probe is "always active". Once the target probe reacts with a target molecule AFB1, a specific signal is output, making it difficult to achieve controllable and precise control of this process. For actual detection samples, due to complexity of the detection samples, such as multiple components, low abundance, and complex structure, it is necessary to achieve real-time and in situ controllable activation while pursuing high sensitivity and high specificity, to thereby achieve precise detection of the target molecule AFB1.

SUMMARY

A purpose of the disclosure is to provide a method for detecting an AFB1 content using fluorescence analysis based on optical sectioning, to solve the above problems in the related art. The method proposed by the disclosure can achieve photosensitivity detection of the AFB1 with high detection sensitivity and strong specificity.

The disclosure utilizes real-time operation and remote triggering of light to develop a biosensor in an "activity inhibition" state, which can avoid shortcomings of the related art. In a process of biosensing, a target recognition unit in the "active inhibition" state remains in an inert state even in the presence of a target molecule AFB1, and is selectively activated to switch to an "on" state until a specific time, and the target recognition unit is bound with the target molecule AFB1 to achieve output of a fluorescence signal.

Based on this, the disclosure provides the following solutions.

The disclosure provides a fluorescence probe combination for detecting an AFB1 content using a fluorescence analysis method based on optical sectioning, and the fluorescence probe combination includes a fluorescence probe aptamer and a fluorescence probe PC-strand.

The nucleotide sequence of the fluorescence probe aptamer is of SEQ ID NO: 1, and a carboxyfluorescein (FAM) group is located at a 3' end of the nucleotide sequence of SEQ ID NO: 1.

The nucleotide sequence of the fluorescence probe PC-strand is of SEQ ID NO: 2, a tetramethylrhodamine (TAMRA) group is located at a 5' end of the nucleotide sequence of SEQ ID NO: 2, and a photocleavable (PC) group is located between $10^{th}$ base pair (bp) and $11^{th}$ bp of the nucleotide sequence of SEQ ID NO: 2.

A structural formula of the PC group is shown as follows:

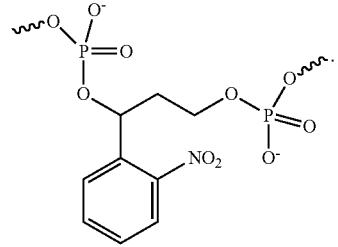

The disclosure further provides an application of the fluorescence probe combination described above, and the application method includes:
  preparing a kit for detecting the AFB1 content using the fluorescence analysis method based on optical sectioning by using the fluorescence probe combination.

The disclosure further provides the kit for detecting the AFB1 content using the fluorescence analysis method based on optical sectioning, and the kit includes the fluorescence probe combination described above.

The disclosure further provides an application of the fluorescence probe combination or the kit described above, and the application method includes:
  detecting the AFB1 content by using the fluorescence probe combination or the kit.

The disclosure further provides a method for detecting the AFB1 content using the fluorescence analysis method based on optical sectioning, and the method includes:
  step 1, performing mixing reaction on an aptamer solution, a PC-strand solution and a tris (hydroxymethyl) aminomethane (Tris) buffer solution to obtain a mixed solution, and performing ultraviolet irradiation on the mixed solution to obtain a mixed reaction system solution;

step 2, taking a same volume of the mixed reaction system solution obtained in the step 1, adding an AFB1 standard solutions with same volume but different concentrations into the same volume of the mixed reaction system solution respectively for reaction to obtain first reaction solutions, and detecting fluorescence intensities of the first reaction solutions respectively to obtain a standard curve for the AFB1 content and the fluorescence intensities; and step 3, adding a to-be-detected sample solution into the mixed reaction system solution obtained in the step 1 for reaction to obtain a second reaction solution, detecting a fluorescence intensity of the second reaction solution, and obtaining, according to the standard curve, an AFB1 content in the to-be-detected sample solution.

In the step 1, the nucleotide sequence of a fluorescence probe aptamer is of SEQ ID NO: 1, and a FAM group is located at a 3' end of the nucleotide sequence of SEQ ID NO: 1. The nucleotide sequence of a fluorescence probe PC-strand is of SEQ ID NO: 2, a TAMRA group is located at a 5' end of the nucleotide sequence of SEQ ID NO: 2, and a PC group is located between $10^{th}$ bp and $11^{th}$ bp of the nucleotide sequence of SEQ ID NO: 2. A structural formula of the PC group is following:

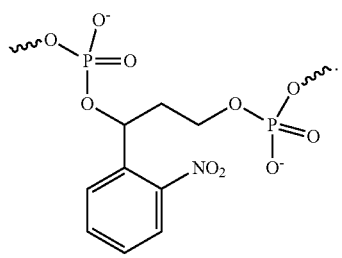

A volume ratio of the mixed reaction system solution and the to-be-detected sample solution in the step 3 are the same as a volume ratio of the mixed reaction system solution and each of the AFB1 standard solutions in the step (2).

In an embodiment, in the mixed solution of the aptamer solution, the PC-strand solution and the tris buffer solution of the step 1, a concentration of the aptamer solution is 0.15 micromoles per liter (µmol/L); and a concentration of the PC-strand solution is 0.24 µmol/L.

In an embodiment, in the step 1, a temperature for the mixing is 4 Celsius degrees (° C.).

In an embodiment, in the step 1, a radiation intensity of the ultraviolet irradiation is 5 milliwatts per square centimeter ($mW/cm^2$).

In an embodiment, a radiation time of the ultraviolet irradiation is 8 minutes (min).

In an embodiment, in the step 2 and the step 3, temperatures of the reaction are 37° C.

The disclosure discloses the following technical effects.

The disclosure uses a fluorescence labeled single strand deoxyribonucleic acid (DNA) aptamer as a fluorescent probe, and uses the PC-strand labeled with optically active group and the fluorescent probe aptamer to complement each other to form double strands. At this time, the quenching group TAMRA is closer to the fluorescent group FAM, resulting in fluorescence quenching. Under a lighting condition, the PC-strand is opened at a position of a photosensitive group to form two segments, and the two segments form double strands with the fluorescent probe aptamer, respectively. At this time, a binding force between the PC-strand and the aptamer is weak. When the target molecule AFB1 is present, the AFB1 specifically binds to the fluorescent probe aptamer to form a secondary structure, while the double-stranded structure formed by the PC-strand and the fluorescent probe aptamer is disrupted, which causes the quenching group TAMRA to move away from the fluorescent group FAM, resulting in fluorescence restoring. Based on a specific recognition function of the aptamer on the AFB1, the fluorescence is not restored when ochratoxin (OTA) or zearalenone (ZEN) with a similar structure to the AFB1 is added. Through monitoring changes in the fluorescence signal, specific detection of the target molecule AFB1 is achieved, and it is applied to the detection of the target molecule AFB1 in foods (e.g., rice, corn, soybeans).

BRIEF DESCRIPTION OF DRAWINGS

In order to describe technical solutions in embodiments of the disclosure or in the related art clearer, drawings required in the embodiments are simply introduced below. Apparently, the drawing in the following description are merely some of the embodiments of the disclosure. For those skilled in the art, other drawings can be obtained according to these drawings without creative work.

DETAILED DESCRIPTION OF EMBODIMENTS

Multiple embodiments of the disclosure are described in detail, the detailed descriptions should not be considered as a limitation of the disclosure, but should be understood as a more detailed description of certain aspects, features, and embodiments of the disclosure.

It should be understood that terms described in the disclosure are only for describing specific embodiments and are not intended to limit the disclosure. Furthermore, for a numerical range in the disclosure, it should be understood that each intermediate value between upper and lower limits of the numerical range is also specifically disclosed. Each smaller range between any stated value or intermediate value within the stated range, as well as any other stated value or intermediate value within the stated range, is also included in the disclosure. The upper and lower limits of these smaller ranges can be independently included or excluded within the numerical range.

Unless otherwise specified, all technical and scientific terms used in this article have same meanings as those commonly understood by those skilled in the art described herein. Although the disclosure only describes some methods and materials, any methods and materials similar or equivalent to those described herein may also be used in an implementation or testing of the disclosure. All literature mentioned in the specification is incorporated by reference to publicly disclose and describe methods and/or materials related to the literature. In case of conflict with any incorporated literature, the content of the specification shall prevail.

It is obvious to those skilled in the art that many improvements and changes can be made to the specific embodiments of the disclosure without departing from a scope or spirit of the disclosure. Other embodiments will be apparent to those skilled in the art from the description of the disclosure. The specification and embodiments of the disclosure are exemplary only.

Terms "including", "comprising", "having" and "containing" used in this article are all open terms, which means including but not limited to.

Figure 1:
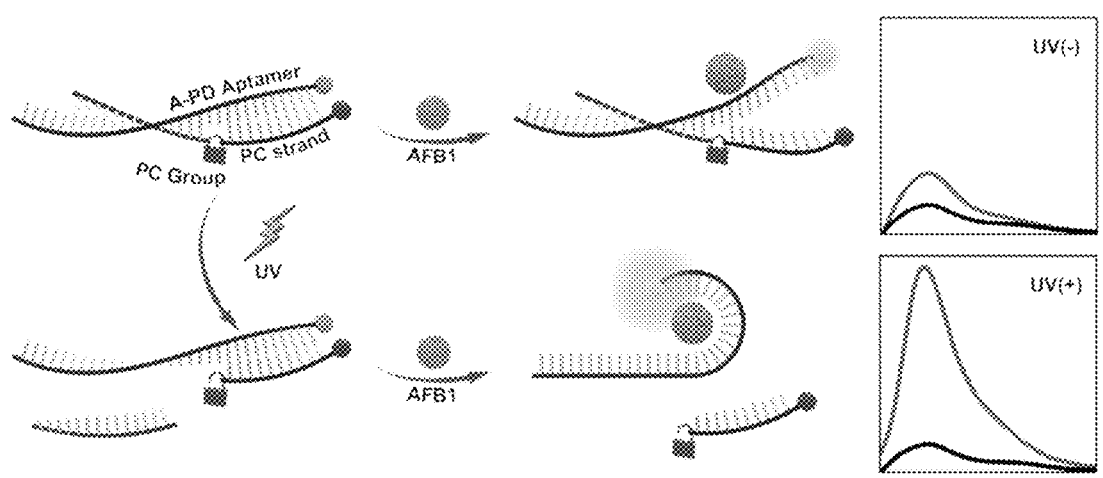
FIG. 1 illustrates a principle diagram of a method for detecting an AFB1 content using fluorescence analysis based on optical sectioning according to an embodiment of the disclosure.
Figure 2:
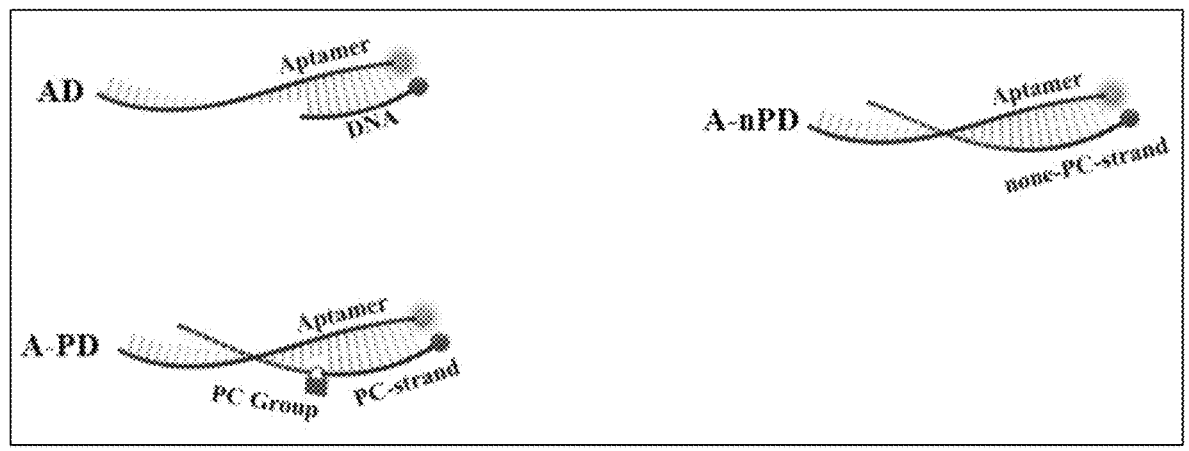
FIG. 2 illustrates a schematic diagram of an aptamer-DNA (AD) double-strand, an aptamer-PC-strand-DNA (A-PD) double-strand and an aptamer-none PC-strand-DNA (A-nPD) double-strand according to an embodiment of the disclosure.

The disclosure is an experimental exploration based on optical sectioning. As shown in FIG. 1, a basic principle of the disclosure is that a fluorescence probe aptamer and PC-strand labeled with an optically active group are partially complementary, to form a double-strand (i.e., A-PD in FIG. 2), and a quenching group TAMRA is closer to a fluorescent group FAM, resulting in fluorescence quenching. Under a lighting condition, the PC-strand breaks at a position of a photosensitive group (i.e., the PC group), to form two segments. The two segments form double strands with the fluorescent probe aptamer, respectively (i.e., AD and A-nPD in FIG. 2). At this time, the aptamer and the PC-strand form two double stranded structures, and a binding force between the PC-strand and the aptamer is weak. When a target molecule AFB1 is introduced, the fluorescent probe aptamer has a specific recognition function on the target molecule AFB1, to form a secondary structure, while the double-stranded structure formed by the PC-strand and the aptamer is disrupted, which causes the quenching group TAMRA to move away from the fluorescent group FAM, resulting in fluorescence restoring. Based on the specific recognition function of the aptamer on the AFB1, the fluorescence is not restored when OTA or ZEN with a similar structure to the AFB1 is added. Through monitoring changes in the fluorescence signal, specific detection of the target molecule AFB1 is achieved, and it is applied to the detection of the target molecule AFB1 in foods (e.g., rice, corn, soybeans).

In the following embodiments, aptamer, PC-strand, none-PC-strand and DNA are synthesized by the Sangon Biotech (Shanghai) Co., Ltd.

Specifically, the nucleotide sequences of the aptamer, the PC-strand, the none-PC-strand and the DNA are as follows:

aptamer: 5'-GTTGGGCACGTGTTGTCTCTCTGTGTCTCG-TGCCCTTCGCTAGGCCC-FAM-3' (as shown in SEQ ID NO: 1);

PC-strand: 5'-TAMRA-GGGCCTAGCG-PC-AAGGGCAC-3' (as shown in SEQ ID NO: 2);

none-PC-strand: 5'-TAMRA-GGGCCTAGCGAAGGGCAC-3' (as shown in SEQ ID NO: 3); and

DNA: 5'-TAMRA-GGGCCTAGCG-3' (as shown in SEQ ID NO: 4).

A chemical structure of a PC group is as follows:

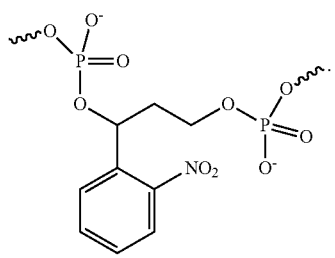

Embodiment 1

1. Method 1.1 Concentration Optimization of an Aptamer Solution

The aptamer (1 μmol/L) solution with different volumes are added into 7 centrifuge tubes, a Tris (10 millimoles per liter (mM) of Tris, 120 mM of sodium chloride (NaCl), 5 mM of potassium chloride (KCl), and power of hydrogen (pH) is 7.2) buffer solution are respectively added into the 7 centrifuge tubes for stirring evenly to obtain mixed solutions, and a total volume of the mixed solution in each centrifuge tube is 80 microliters (μL). In the 7 centrifuge tubes, final concentrations of the aptamer are respectively as 0.5 μmol/L, 0.25 μmol/L, 0.2 μmol/L, 0.15 μmol/L, 0.1 μmol/L, 0.07 μmol/L and 0.03 μmol/L. After stirring evenly, fluorescence intensity of the aptamer in the 7 centrifuge tubes is detected. Conditions for detecting the fluorescence intensity are as follows: an excitation wavelength is 480 nanometers (nm), a scanning range is 490-700 nm, a voltage is 700 volts (V), and a slit is 5/5.

1.2 Screening of a Reaction Temperature Between the Aptamer and the PC-Strand 4 centrifuge tubes each are added with the aptamer solution, a PC-strand solution and the Tris (10 mM of Tris, 120 mM of NaCl, 5 mM of KCl and pH=7.2) buffer solution for stirring evenly to obtain mixed solutions, and a total volume of the mixed solution in each centrifuge tube is 80 μL. In the 4 centrifuge tubes, a final concentration of the aptamer is 0.15 μmol/L, and a final concentration of the PC-strand is 0.18 μmol/L. The mixed solutions in the 4 centrifuge tubes are respectively reacted at 4° C., 15° C., 25° C. and 37° C. for 1 hour (h), and fluorescence intensity of the aptamer in the 4 centrifuge tubes is detected.

The conditions for detecting the fluorescence intensity are as follows: the excitation wavelength is 480 nm, the scanning range is 490-700 nm, the voltage is 700 V, and the slit is 5/5.

1.3 Screening of a Concentration of the PC-Strand 12 centrifuge tubes each are added with the aptamer solution, the PC-strand solution and the Tris (10 mM of Tris, 120 mM of NaCl, 5 mM of KCl and pH=7.2) buffer solution for stirring evenly to obtain mixed solutions, and a total volume of the mixed solution in each centrifuge tube is 80 μL. The mixed solutions in the 12 centrifuge tubes are reacted at 4° C. for 1 h, and then fluorescence intensity of the aptamer in the 12 centrifuge tubes is detected. In the 12 centrifuge tubes, a final concentration of the aptamer is 0.15 μmol/L, and final concentrations of the PC-strand are respectively as 0 μmol/L, 0.03 μmol/L, 0.06 μmol/L, 0.09 μmol/L, 0.12 μmol/L, 0.15 μmol/L, 0.18 μmol/L, 0.21 μmol/L, 0.24 μmol/L, 0.27 μmol/L, 0.3 μmol/L and 0.33 μmol/L.

The conditions for detecting the fluorescence intensity are as follows: the excitation wavelength is 480 nm, the scanning range is 490-700 nm, the voltage is 700 V, and the slit is 5/5.

1.4 Base Influence Experiment

As shown in Table 1, a centrifuge tube 1 is added with the aptamer solution, a DNA solution and the Tris (10 mM of Tris, 120 mM of NaCl, 5 mM of KCl and pH=7.2) buffer solution, and a centrifuge tube 2 is added with the aptamer solution, the PC-strand solution and the Tris (10 mM of Tris, 120 mM of NaCl, 5 mM of KCl and pH=7.2) buffer solution for stirring evenly to obtain mixed solutions, and a total volume of the mixed solution in each centrifuge tube is 80 μL. The mixed solutions in the 2 centrifuge tubes are reacted at 4° C. for 1 h, a AFB1 standard solution is added into the 2 centrifuge tubes to react at 37° C. for 1 h, and then fluorescence intensity of the aptamer in the 2 centrifuge tubes is detected. In the 2 centrifuge tubes, a final concentration of the aptamer is 0.15 μmol/L, a final concentration of the PC-strand is 0.24 μmol/L, a final concentration of the DNA is 0.24 μmol/L, and a final concentration of the AFB1 standard solution is 150 nanograms per milliliter (ng/ml).

TABLE 1

| Centrifuge tube number | Aptamer | DNA/PC-strand | AFB 1 standard solution |
| --- | --- | --- | --- |
| 1 | 0.15 μmol/L | DNA 0.24 μmol/L | 150 ng/mL |
| 2 | 0.15 μmol/L | PC-strand 0.24 μmol/L | 150 ng/mL |

The conditions for detecting the fluorescence intensity are as follows: the excitation wavelength is 480 nm, the scanning range is 490-700 nm, the voltage is 700 V, and the slit is 5/5.

1.5 PC Group Influence Experiment

As shown in Table 2, 8 centrifuge tubes are taken and numbered as 1-8, and the 8 centrifuge tubes are treated as follows.

The centrifuge tubes 1~4 each are added with the aptamer solution, the DNA solution and the Tris buffer solution, and the centrifuge tubes 5-8 each are added with the aptamer solution, a none-PC-strand solution and the Tris buffer solution for stirring evenly to obtain mixed solutions. The mixed solutions in the centrifuge tubes 1-8 are reacted at 4° C. for 1 h to obtain reacted solutions. The reacted solutions in the centrifuge tubes 1-2 and 5-6 are not treated with light, the reacted solutions in the centrifuge tubes 2 and 6 are added with the AFB1 standard solution to react at 37° C. for 1 h, and fluorescence intensity of the aptamer in the centrifuge tubes 1-2 and 5-6 is detected, and a total volume of the solution in each centrifuge tube is 80 µL. The centrifuge tubes 1 and 5 are control groups of the centrifuge tubes 2 and 6, and are not added with the AFB1 standard solution. The centrifuge tubes 3-4 and 7-8 are irradiated with ultraviolet light (irradiation intensity is 5 mW/cm$^2$) for 20 min. The centrifuge tubes 4 and 8 are added with the AFB1 standard solution to react at 37° C. for 1 h, and fluorescence intensity of the aptamer in the centrifuge tubes 3-4 and 7-8 is detected, and a total volume of the solution in each centrifuge tube is 80 µL. The centrifuge tubes 3 and 7 are control groups of the centrifuge tubes 4 and 8, and are not added with the AFB1 standard solution.

A final concentration of the aptamer is 0.15 µmol/L, a final concentration of the none-PC-strand is 0.24 µmol/L, a final concentration of the DNA is 0.24 µmol/L, and a final concentration of the AFB1 standard solution is 150 ng/mL.

The conditions for detecting the fluorescence intensity are as follows: the excitation wavelength is 480 nm, the scanning range is 490-700 nm, the voltage is 700 V, and the slit is 5/5.

centrifuge tube 3 is a control group of the centrifuge tube 4, and is not added with the AFB1 standard solution.

A final concentration of the aptamer is 0.15 µmol/L, a final concentration of the PC-strand is 0.24 µmol/L, and a final concentration of the AFB1 standard solution is 150 ng/ml.

The conditions for detecting the fluorescence intensity are as follows: the excitation wavelength is 480 nm, the scanning range is 490-700 nm, the voltage is 700 V, and the slit is 5/5.

30% acrylamide (5 milliliters abbreviated as mL), 5× tris-borate-ethylene diamine tetra acetic acid (TBE) buffer solution (2 mL), formamide (2 mL), urea (4.2 grams abbreviated as g), 10% ammonium persulfate (90 µL) and N,N, N',N'-tetramethylethylenediamine (90 µL) are mixed evenly, and are placed into a gel electrophoresis plate to be placed at room temperature until the gel sets. DNA samples (10 µL), 6× loading buffer (2 µL) and a GELRED dye are added into each well of the gel electrophoresis plate. An electrophoresis experiment is performed for 1.5 h with a voltage of 90 V, and then gels are taken to observe DNA sample bands under a gel electrophoresis imaging device.

1.7 Lighting Time Influence Experiment 10 centrifuge tubes are numbered as 1-10, and added with the aptamer solution, the PC-strand solution and the Tris buffer solution to react at 4° C. for 1 h. The centrifuge tubes 1-10 are respectively irradiated with the ultraviolet light (irradiation intensity is 5 mW/cm$^2$) for 0 min, 1 min, 2 min, 3 min, 4 min, 5 min, 6 min, 7 min, 8 min and 9 min, and are added with the AFB1 standard solution to react at 37° C. for 1 h, and fluorescence intensity of the aptamer in the 10 centrifuge tubes is detected, and a total volume of the solution in each centrifuge tube is 80 µL.

In the 10 centrifuge tubes, a final concentration of the aptamer is 0.15 µmol/L, a final concentration of the PC-strand is 0.24 µmol/L, and a final concentration of the AFB1 standard solution is 150 ng/mL.

TABLE 2

| Centrifuge tube number | Aptamer (µmol/L) | DNA (µmol/L) | None-PC-strand (µmol/L) | AFB1 standard solution (ng/ml) | Time for Uv treatment (min) |
|---|---|---|---|---|---|
| 1 | 0.15 | 0.24 | 0 | 0 | 0 |
| 2 | 0.15 | 0.24 | 0 | 150 | 0 |
| 3 | 0.15 | 0.24 | 0 | 0 | 20 |
| 4 | 0.15 | 0.24 | 0 | 150 | 20 |
| 5 | 0.15 | 0 | 0.24 | 0 | 0 |
| 6 | 0.15 | 0 | 0.24 | 150 | 0 |
| 7 | 0.15 | 0 | 0.24 | 0 | 20 |
| 8 | 0.15 | 0 | 0.24 | 150 | 20 |

1.6 Light Influence Experiment 4 centrifuge tubes are numbered as 1-4, and added with the aptamer solution, the PC-strand solution and the Tris buffer solution to react at 4° C. for 1 h. The centrifuge tubes 1 and 2 are irradiated with ultraviolet light (irradiation intensity is 5 mW/cm$^2$) for 20 min. The centrifuge tube 2 is added with the AFB1 standard solution to react at 37° C. for 1 h, and fluorescence intensity of the aptamer in the centrifuge tubes 1 and 2 is detected, and a total volume of the solution in each centrifuge tube is 80 µL. The centrifuge tube 1 is a control group of the centrifuge tube 2, and is not added with the AFB1 standard solution. The centrifuge tubes 3 and 4 are not treated with the ultraviolet light. The centrifuge tube 4 is added with the AFB1 standard solution to react at 37° C. for 1 h, and fluorescence intensity of the aptamer in the centrifuge tubes 3 and 4 is detected, and a total volume of the solution in each centrifuge tube is 80 µL. The The conditions for detecting the fluorescence intensity are as follows: the excitation wavelength is 480 nm, the scanning range is 490-700 nm, the voltage is 700 V, and the slit is 5/5.

4 centrifuge tubes are numbered as 1-4, and added with the aptamer solution, the PC-strand solution and the Tris buffer solution to react at 4° C. for 1 h. After the centrifuge tube 4 is irradiated with the ultraviolet light (irradiation intensity is 5 mW/cm$^2$) for 8 min, the centrifuge tubes 3 and 4 are added with the AFB1 standard solution to react at 37° C. for 1 h, circular dichroisms (CD) of the solutions in the centrifuge tubes 3 and 4 are detected, and a total volume of the solution in each centrifuge tube is 80 µL.

A final concentration of the aptamer is 0.15 µmol/L, a final concentration of the PC-strand is 0.24 µmol/L, and a final concentration of the AFB1 standard solution is 150 ng/ml.

Testing conditions of a CD spectrometer are as follows: a spectral scanning range is 200-340 nm, an interval is 0.5 nm, and the Tris buffer solution is used to subtract spectral background.

1.8 Screening of a Reaction Temperature of the AFB1

4 centrifuge tubes are numbered as 1-4, and added with the aptamer solution, the PC-strand solution and the Tris buffer solution to react at 4° C. for 1 h. The centrifuge tubes 1~4 are irradiated with the ultraviolet light (irradiation intensity is 5 mW/cm$^2$) for 8 min, and are added with the AFB1 standard solution to react at different temperatures (4° C., 15° C., 25° C. and 37° C.) for 1 h, fluorescence intensity of the aptamer in the centrifuge tubes 1~4 is detected, and a total volume of the solution in each centrifuge tube is 80 μL.

A final concentration of the aptamer is 0.15 μmol/L, a final concentration of the PC-strand is 0.24 μmol/L, and a final concentration of the AFB1 standard solution is 150 ng/mL.

The conditions for detecting the fluorescence intensity are as follows: the excitation wavelength is 480 nm, the scanning range is 490-700 nm, the voltage is 700 V, and the slit is 5/5.

1.9 Sensitivity of AFB1 Detection 13 centrifuge tubes are numbered as 1-13, and added with the aptamer solution, the PC-strand solution and the Tris buffer solution to react at 4° C. for 1 h. The centrifuge tubes 1-13 are irradiated with the ultraviolet light (irradiation intensity is 5 mW/cm$^2$) for 8 min, and are added with the AFB1 standard solution with different concentrations to react at 37° C. for 1 h, the fluorescence intensity is detected, and a total volume of the solution in each centrifuge tube is 80 μL.

A final concentration of the Aptamer is 0.15 μmol/L, a final concentration of the PC-strand is 0.24 μmol/L, and final concentrations of the AFB1 standard solution are 0 ng/ml, 0.00625 ng/mL, 0.0875 ng/ml, 0.0125 ng/ml, 0.025 ng/ml, 0.0625 ng/ml, 0.625 ng/ml, 6.25 ng/ml, 62.5 ng/ml and 625 ng/mL.

The conditions for detecting the fluorescence intensity are as follows: the excitation wavelength is 480 nm, the scanning range is 490-700 nm, the voltage is 700 V, and the slit is 5/5.

1.10 Specificity of the AFB1 Detection 6 centrifuge tubes are numbered as 1-6, and added with the aptamer solution, the PC-strand solution and the tris buffer solution to react at 4° C. for 1 h. The centrifuge tubes 1-6 are irradiated with the ultraviolet light (irradiation intensity is 5 mW/cm$^2$) for 8 min. The centrifuge tube 1 is used as a control group, and is not added with mycotoxins. The centrifuge tubes 2-4 are added with mycotoxins: the AFB1 standard solution, an OTA standard solution and a ZEN standard solution, respectively. The centrifuge tube 5 is added with the AFB1 standard solution and the OTA standard solution. The centrifuge tube 6 is added with the AFB1 standard solution and the ZEN standard solution. After the solutions in the centrifuge tubes 1-6 are reacted at 37° C. for 1 h, fluorescence intensity is detected, and a total volume of the solution in each centrifuge tube is 80 μL.

A final concentration of the Aptamer is 0.15 μmol/L, a final concentration of the PC-strand is 0.24 μmol/L, and final concentrations of the AFB1 standard solution, the OTA standard solution and the ZEN standard solution are 150 ng/mL.

The conditions for detecting the fluorescence intensity are as follows: the excitation wavelength is 480 nm, the scanning range is 490-700 nm, the voltage is 700 V, and the slit is 5/5.

1.11 Application Experiment of the AFB1 Detection

Extraction of the AFB1 in food samples: the food samples (corn, rice and soybeans) are crushed into powder by using a grinder, and the AFB1 is extracted from the food samples according to Chinese National Food Safety Standards (GB5009. 22-2016). Specifically, 3 g of the food samples are added into 10 mL methanol/water (7:3) solution for oscillation reaction at 30° C. for 1 h to obtain a mixture. The mixture is filtered to obtain filtrate. The filtrate is centrifuged with 12000 revolutions per minute (rpm) at 4° C. for 10 min to obtain supernatant. The supernatant is collected and filtered with a 0.45 microns (μm) filter to obtain filtered supernatant. The filtered supernatant is added with 3 mL Tris solution for stirring evenly to obtain a food sample extraction solution, and the food sample extraction solution is stored at 4° C. for later use.

The AFB1 detection in the food samples includes the following steps.

90 μL food sample (corn, rice and soybeans) extraction solution is added with different volumes of the ABF1 standard solution for stirring evenly to obtained food sample solutions with different ABF1 concentrations (the concentrations of the AFB1 are 0 ng/mL, 0.075 ng/ml, 0.125 ng/mL, 0.75 ng/ml and 1.25 ng/ml), and the food sample solutions are stored at 4° C. for later use.

5 centrifuge tubes are numbered as 1-5, and added with the aptamer solution, the PC-strand solution and the Tris buffer solution to react at 4° C. for 1 h. A final concentration of the aptamer is 0.15 μmol/L, and a final concentration of the PC-strand is 0.24 μmol/L. The centrifuge tubes 1-5 are irradiated with the ultraviolet light (irradiation intensity is 5 mW/cm$^2$) for 8 min, and are respectively added with the above food sample solutions with different ABF1 concentrations to reacted at 37° C. for 1 h, and a total volume of the solution in each centrifuge tube is 80 μL.

Detection conditions in the AFB1 solution are as follows: the excitation wavelength is 480 nm, the scanning range is 490-700 nm, the voltage is 700 V, and the slit is 5/5.

2 Experimental Results 2.1 Screening Result of the Concentration of the Aptamer

Figure 3:
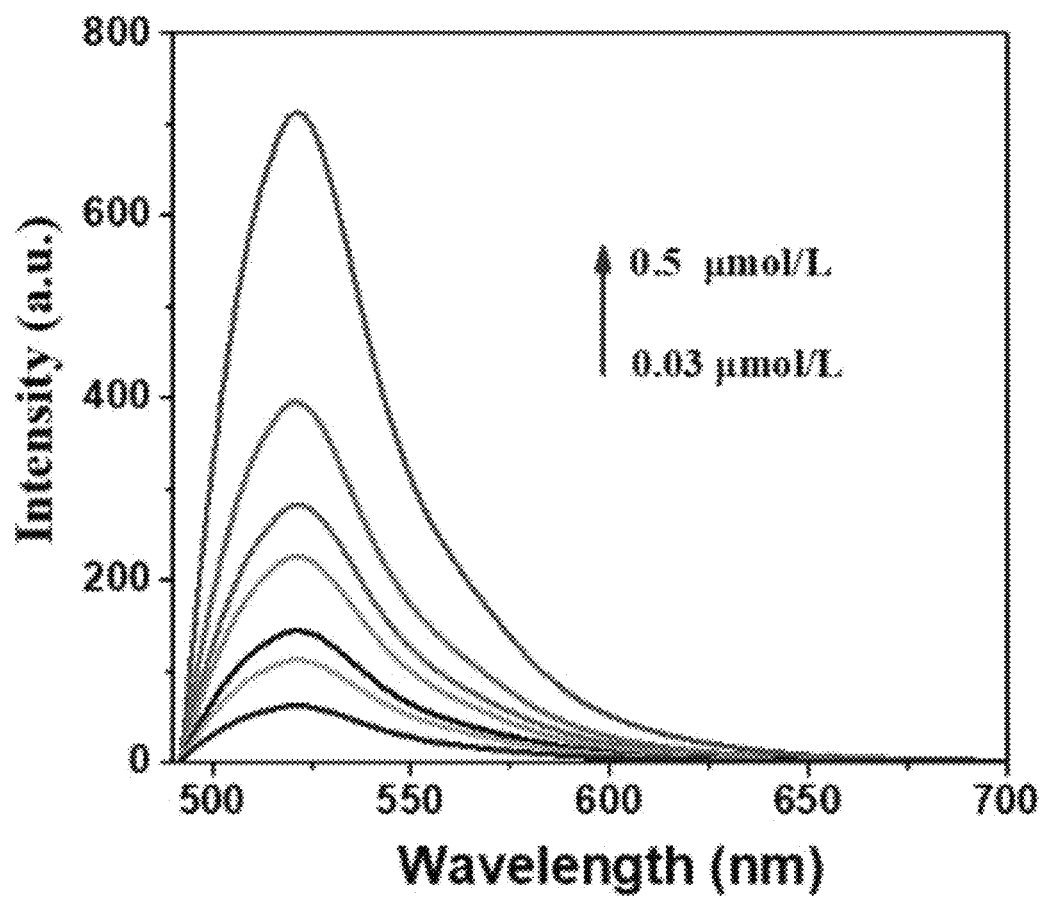
FIG. 3 illustrates a schematic diagram of a fluorescence detection result of a concentration optimization experiment of an aptamer solution according to an embodiment of the disclosure.

The aptamer is a fluorescence probe with good fluorescence characteristic, and the TAMRA can effectively quench FAM fluorescence. Thus, the concentration of the aptamer needs to be screened before using the PC-strand to select a concentration of the aptamer with good luminescence reaction effect, and achieve principles of saving raw materials and economy at the same time. It can be seen from FIG. 3 that with the increase of the concentration of the aptamer, the fluorescence intensity gradually increased. When the concentration of the aptamer is 0.15 μmol/L, the fluorescence intensity is 225.78633, and the aptamer solution with the concentration of 0.15 μmol/L can be selected to participate in the follow-up experiments.

Figure 4A:
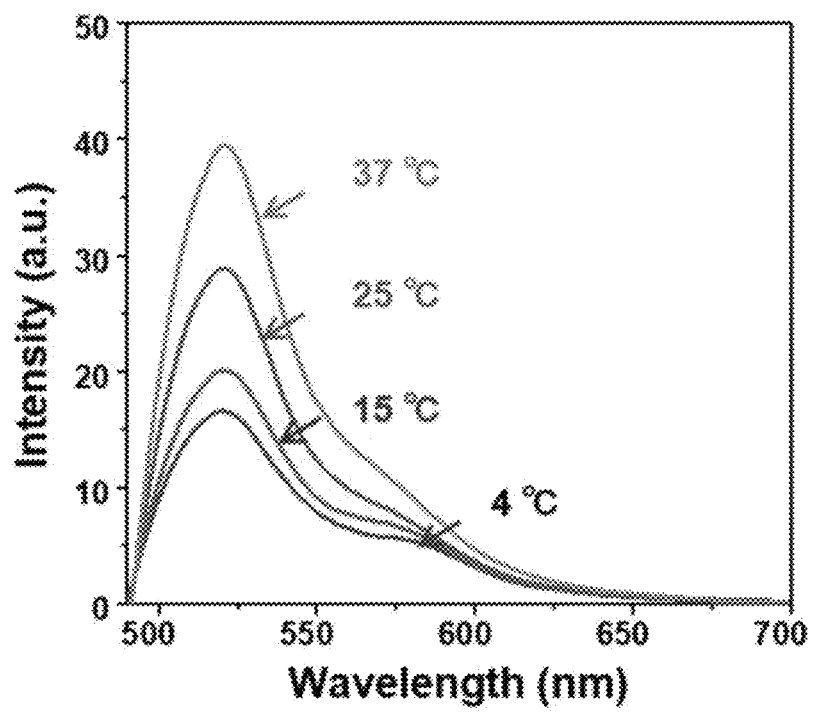
FIG. 4A illustrates a fluorescence curve diagram of an optimization experimental result of a reaction temperature between aptamer and PC-strand according to an embodiment of the disclosure.
Figure 4B:
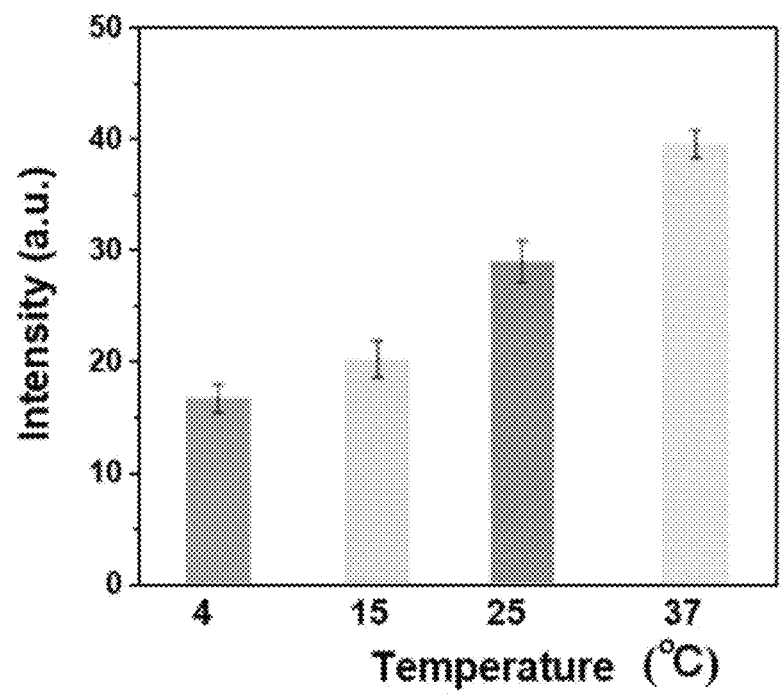
FIG. 4B illustrates a histogram of the optimization experimental result of the reaction temperature between the aptamer and the PC-strand according to the embodiment of the disclosure.
Figure 5A:
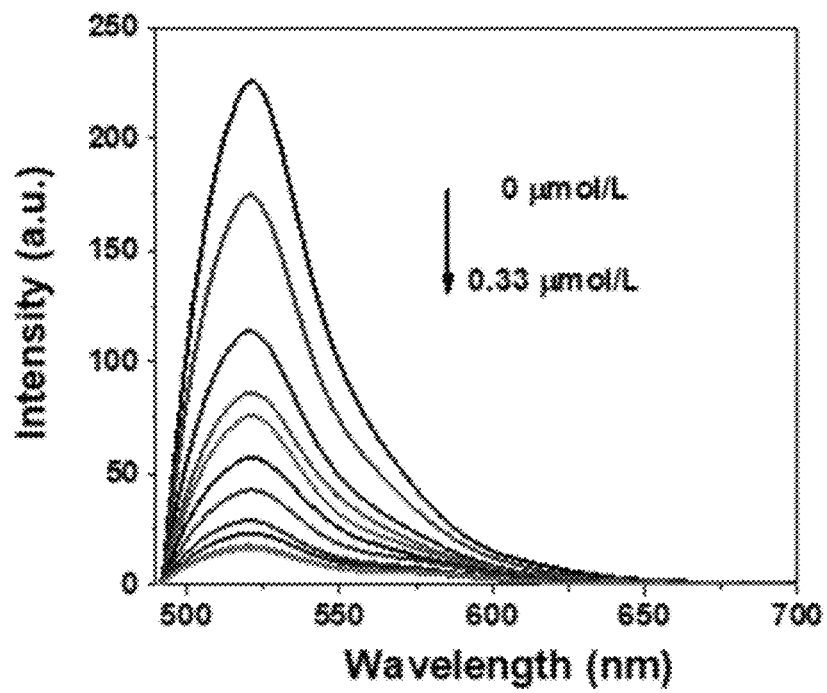
FIG. 5A illustrates a fluorescence curve diagram of a screening experiment result of a concentration of the PC-strand according to an embodiment of the disclosure.
Figure 5B:
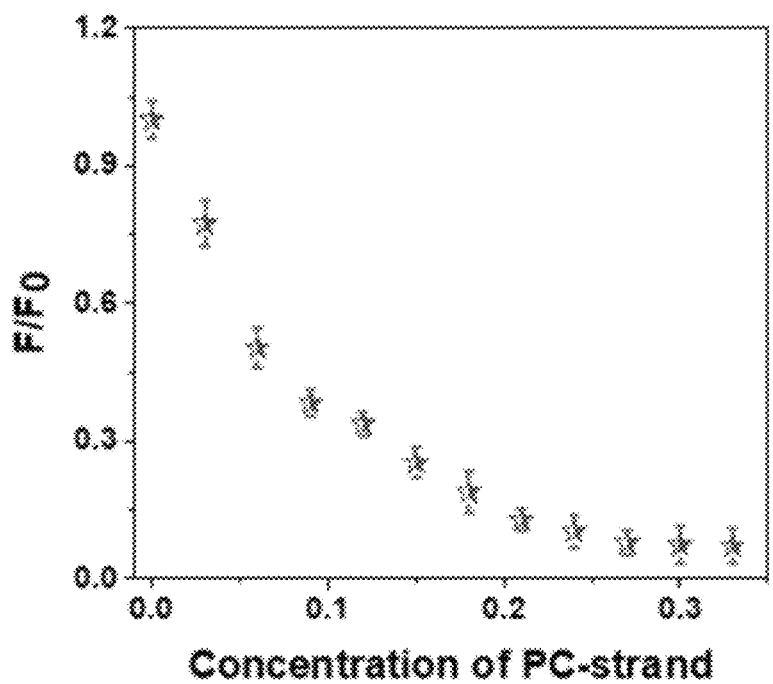
FIG. 5B illustrates a point diagram of the screening experiment result of the concentration of the PC-strand according to the embodiment of the disclosure.

2.2 Screening Result of the Reaction Temperature Between the Aptamer and the PC-Strand Temperature will affect the fluorescence quenching effect to some extent, the reaction temperature needs to be optimized to restore the fluorescence to the optimal effect when the AFB1 is added in the subsequent experiment, to thereby select an optimal temperature for fluorescence quenching. According to the optimized fluorescence curve diagram and histogram of the reaction temperature between the aptamer and the PC-strand made by experiments (as shown in FIGS. 4A and 4B), it can be seen that with the increase of the reaction temperature, the fluorescence intensity is enhanced, which indicates that low temperature is beneficial to hybridization between the aptamer and the PC-strand, and the fluorescence quenching effect is optimal when the reaction temperature is 4° C. Therefore, the temperature used in the subsequent experiments is 4° C. 2.3 Screening result of the concentration of the PC-strand It can be seen from FIGS. 5A and 5B that with the increase of the concentration of the PC-strand, the fluorescence intensity of the aptamer is gradually decreased, and when the concentration of the PC-strand is 0.24 μmol/L ($C_{Aptamer}$:$C_{PC-strand}$=1:1.6), the fluorescence quenching tends to be stable. Therefore, the concentration of the PC-strand is selected as 0.24 μmol/L in the subsequent experiments.

2.4 Result of the Base Influence Experiment

Figure 6A:
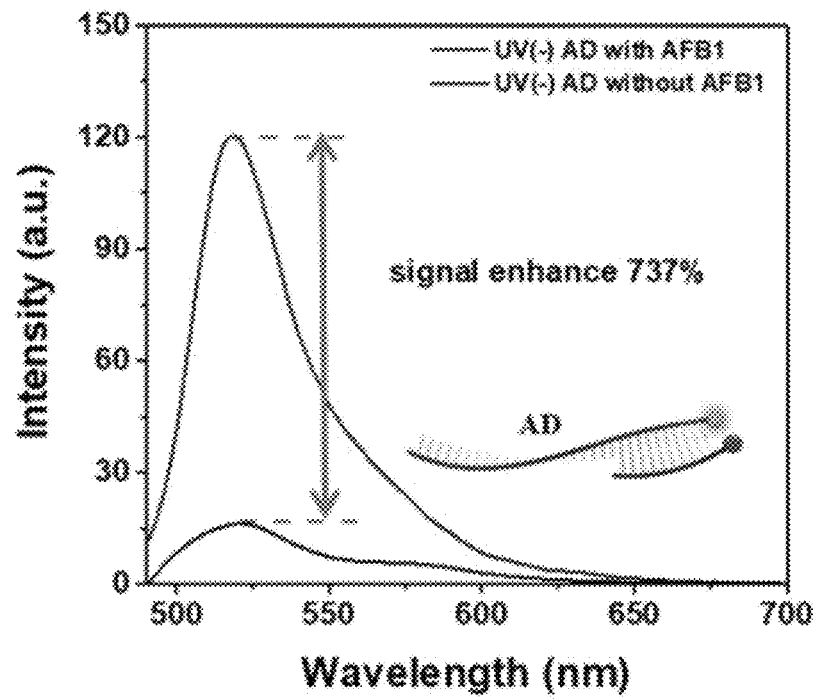
FIG. 6A illustrates a schematic diagram of a fluorescence intensity detection result before and after adding an AFB1 standard solution in a centrifuge tube 1 for a base influence experiment according to an embodiment of the disclosure.
Figure 6B:
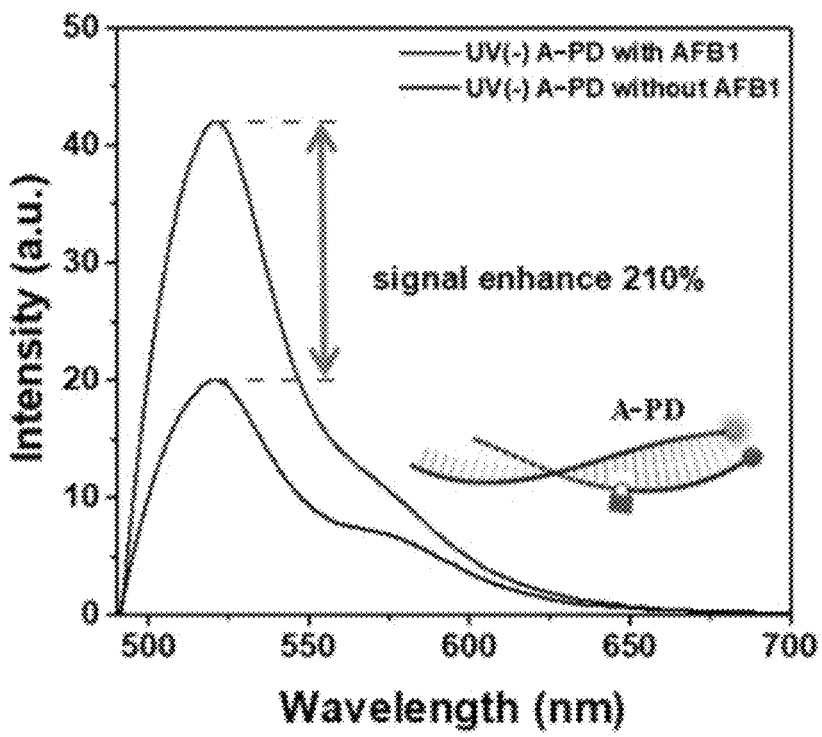
FIG. 6B illustrates a schematic diagram of a fluorescence intensity detection result before and after adding the AFB1 standard solution in a centrifuge tube 2 for the base influence experiment according to the embodiment of the disclosure.

As shown in FIGS. 6A and 6B, when the concentration of the AFB1 is 150 ng/ml and without lighting condition, due to a fluorescence resonance energy transfer (FRET) effect, the fluorescence change of A-PD is weak, and the fluorescence signal is enhanced by 2.1 times (as shown in FIG. 6B), while the AD without 8 bases and the PC group produces obvious fluorescence signal change, and the fluorescence signal is enhanced by 7.37 times (as shown in FIG. 6A). It indicates that increasing the base numbers, the binding force of the aptamer of the AFB1 and the DNA is strong, which reduces the sensing performance.

2.5 Result of the PC Group Influence Experiment

Figure 7A:
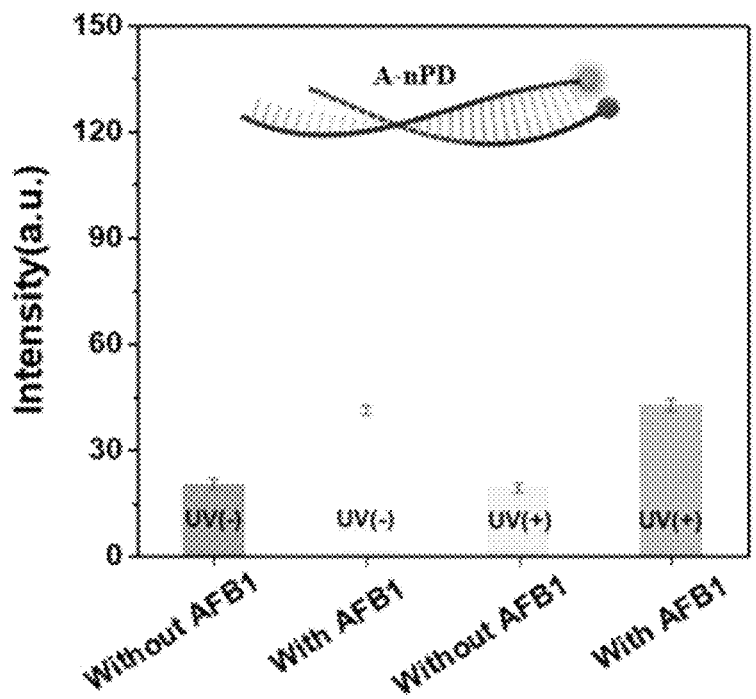
FIG. 7A illustrates a schematic diagram of a fluorescence intensity detection result of centrifuge tubes 1-4 for a PC group influence experiment according to an embodiment of the disclosure.
Figure 7B:
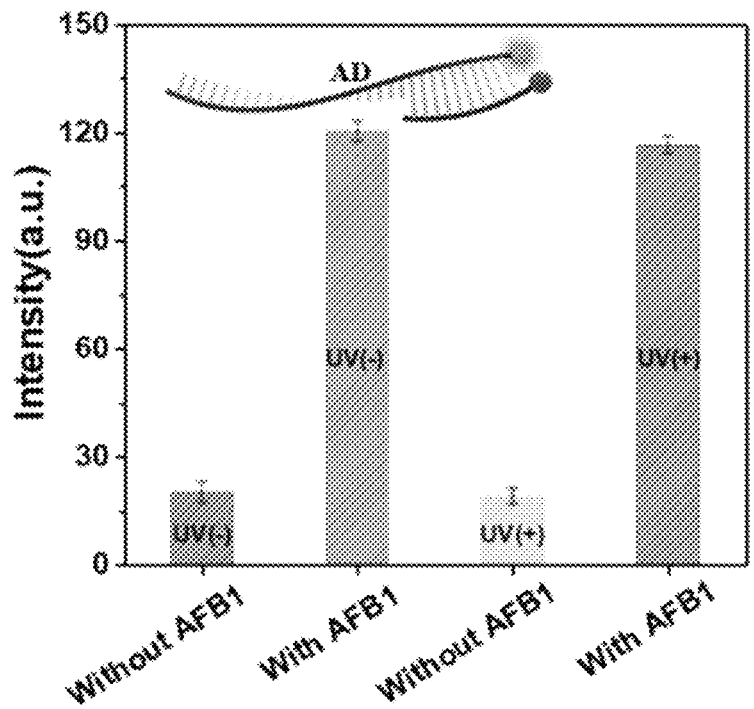
FIG. 7B illustrates a schematic diagram of a fluorescence intensity detection result of centrifuge tubes 5-8 for the PC group influence experiment according to the embodiment of the disclosure.

As shown in FIGS. 7A and 7B, when the concentration of the AFB1 is 150 ng/ml and without the lighting condition, the fluorescence signal of the A-nPD without the PC group increases by 210%, and the fluorescence signal of the AD without the PC group and 8 bases increases by 601%. When the concentration of the AFB1 is 150 ng/mL and with the lighting condition, the fluorescence signal of the A-nPD increases by 223%, and the fluorescence signal of the AD increases by 613%, which indicates that the light has no effect on the fluorescence change of the A-nPD and the AD. Therefore, introducing the PC group into the A-PD is a key to a design of time gating for detecting AFB1.

2.6 Result of the Light Influence Experiment

Figure 8A:
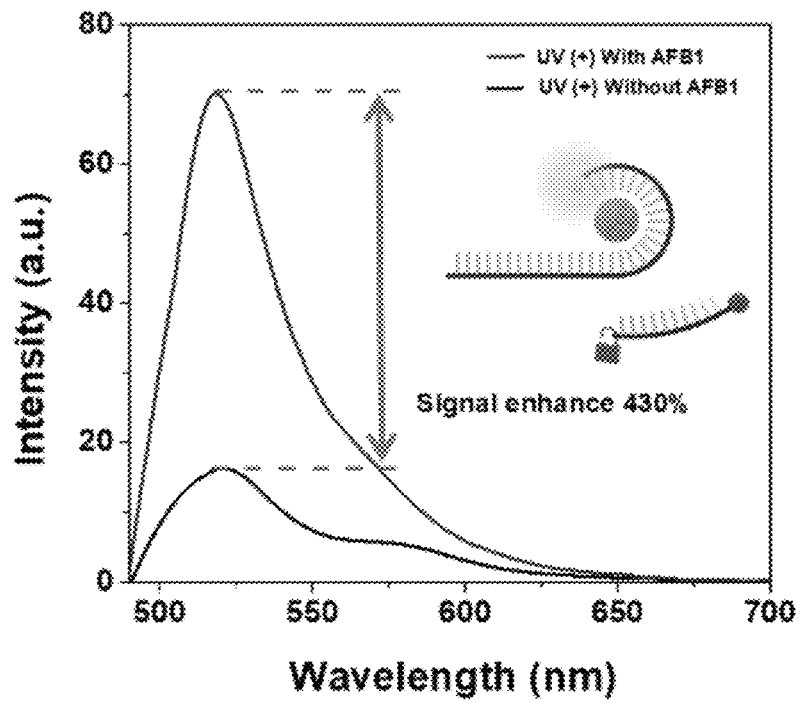
FIG. 8A illustrates a schematic diagram of a fluorescence intensity detection result of centrifuge tubes 1-2 for a light influence experiment according to an embodiment of the disclosure.
Figure 8B:
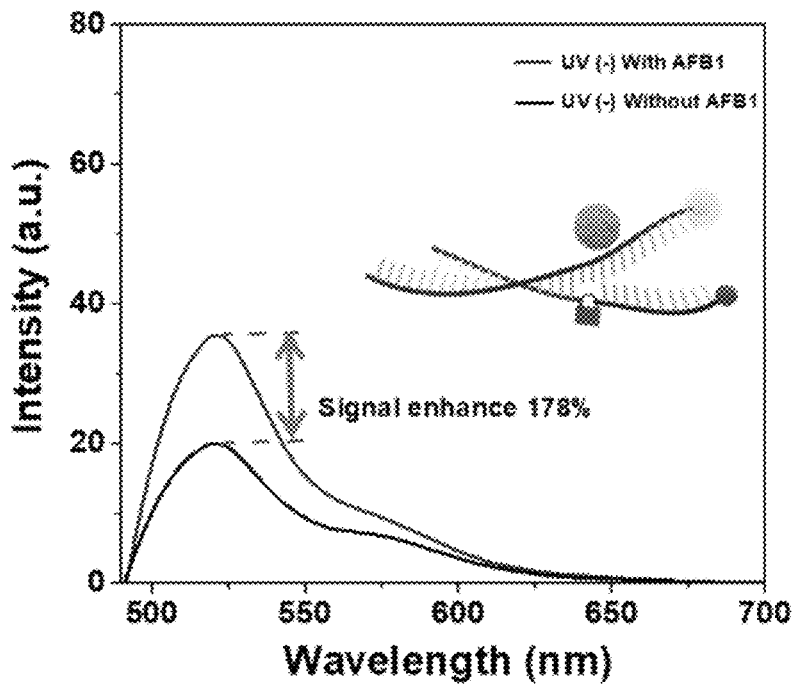
FIG. 8B illustrates a schematic diagram of a fluorescence intensity detection result of centrifuge tubes 3-4 for the light influence experiment according to the embodiment of the disclosure.

As shown in FIGS. 8A and 8B, when the concentration of the AFB1 is 100 ng/ml and with irritation under irritation intensity of 5 mW/cm$^2$, the fluorescence intensity increases by 430%. When the concentration of the AFB1 is 100 ng/ml and without the irritation, the fluorescence intensity increases by 178%. The result shows that light can activate the sensing function and expand the detection range.

Figure 9:
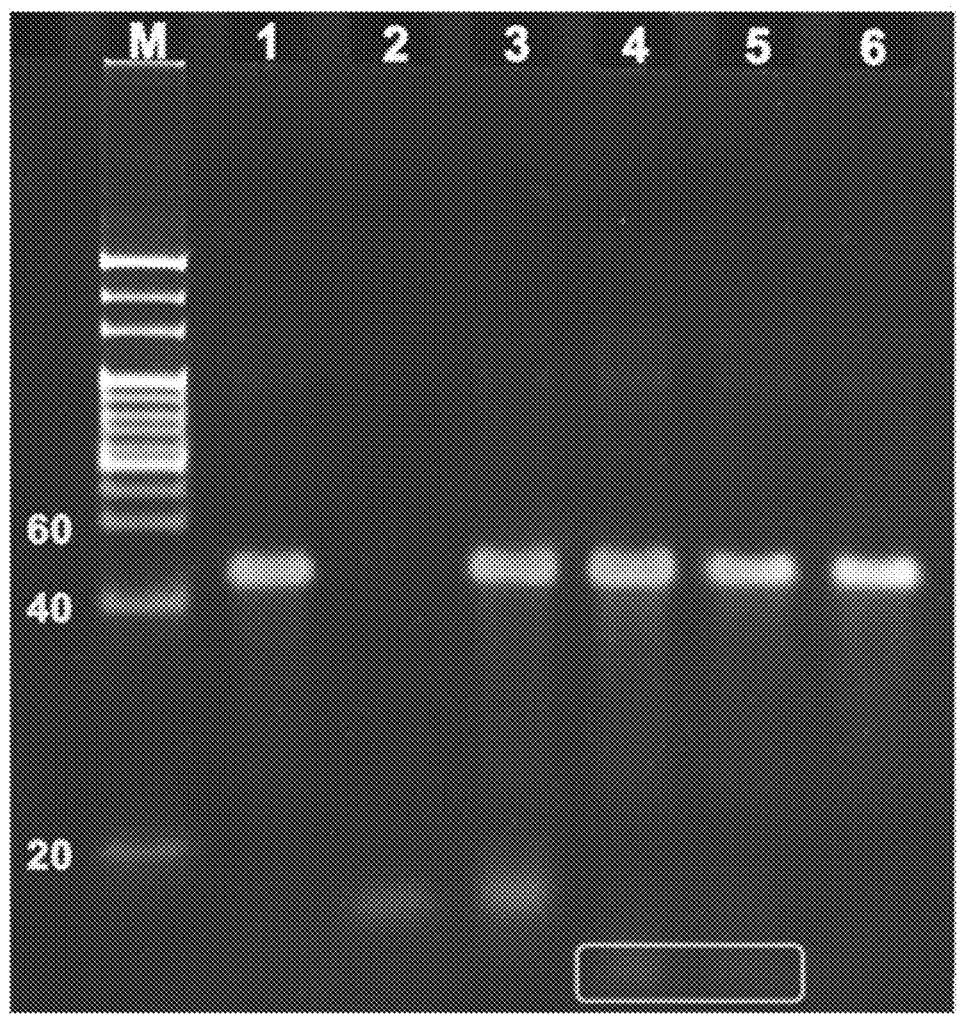
FIG. 9 illustrates a gel electrophoresis diagram of influence of light on AFB1 detection according to an embodiment of the disclosure. Specifically, M represents a DNA leader marker with 20 bp, 1 represents the aptamer, 2 represents the PC-strand, 3 represents aptamer+PC-strand+AFB1 without a lighting condition, 4 represents aptamer+PC-strand with the lighting condition, and 5 represents aptamer+PC-strand+AFB1 with the lighting condition; 6 represents aptamer+AFB1; and a box part represents product fragments of the PC group breaking after the PC-strand is irradiated by light.

It can be seen from FIG. 9 that the PC group of the PC-strand is disconnected with the lighting condition.

2.7 Result of the Lighting Time Influence Experiment

Figure 10A:
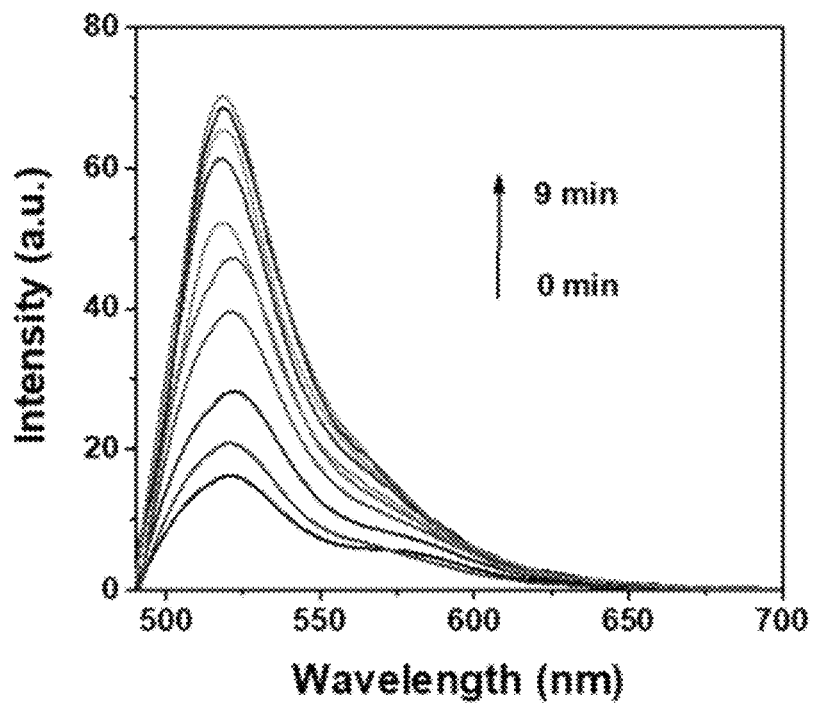
FIG. 10A illustrates a fluorescence curve diagram of a result of a lighting time influence experiment according to an embodiment of the disclosure.
Figure 10B:
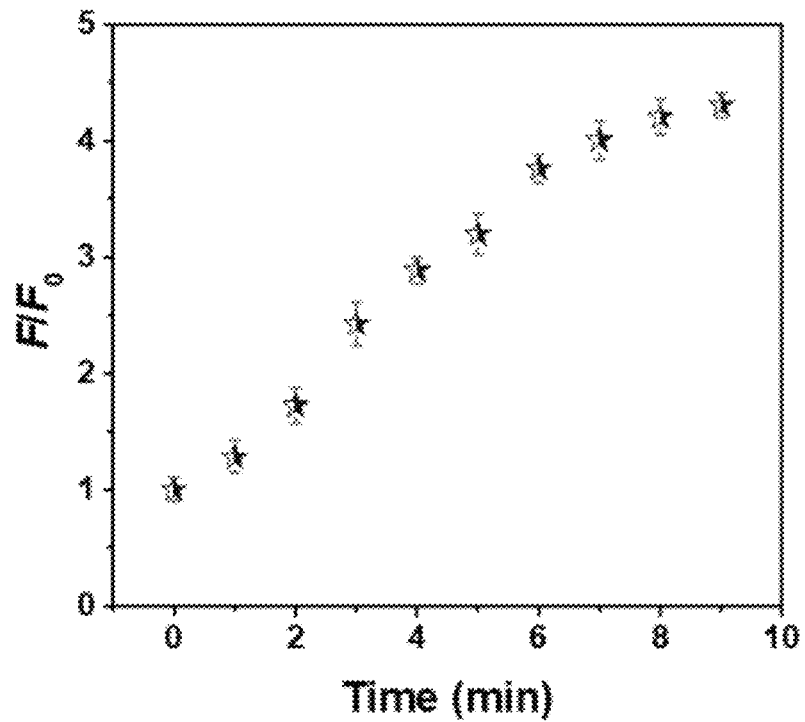
FIG. 10B illustrates a point diagram of the result of the lighting time influence experiment according to the embodiment of the disclosure.

As shown in FIGS. 10A and 10B, when the concentration of the AFB1 is 100 ng/ml and with the irritation under irritation intensity of 5 mW/cm$^2$, the fluorescence intensity of the A-PD increases gradually. Long-term lighting causes more PC groups to be disconnected and more photoactivated probes to bind to the AFB1, resulting in enhanced fluorescence, but after 8 min, the fluorescence gradually stabilized. The result shows that the light can activate the sensing function, and the lighting time is 8 min.

Figure 11A:
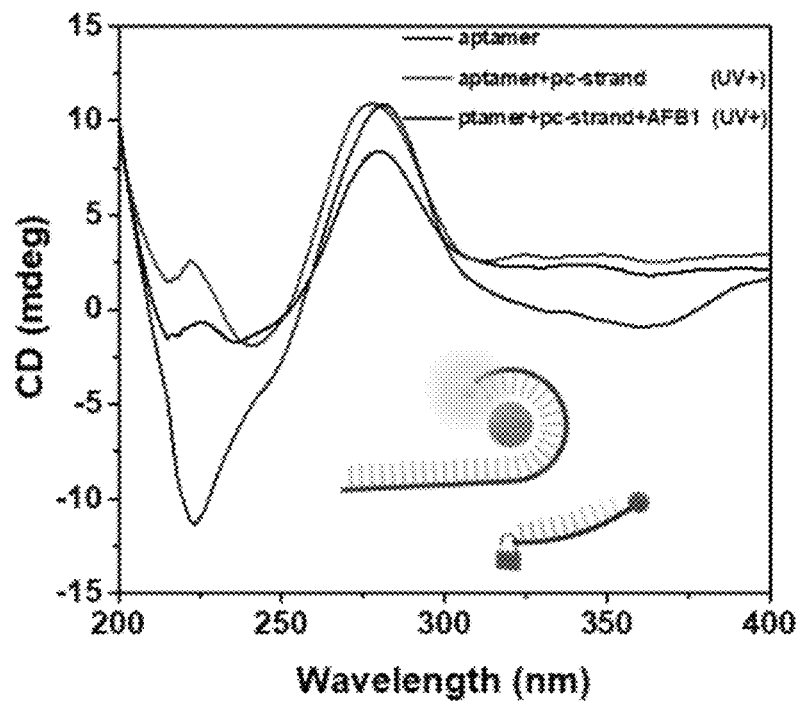
FIG. 11A illustrates a circular dichroism diagram of the aptamer, the aptamer+PC-strand and aptamer+PC-strand+AFB1 under the lighting condition according to an embodiment of the disclosure.
Figure 11B:
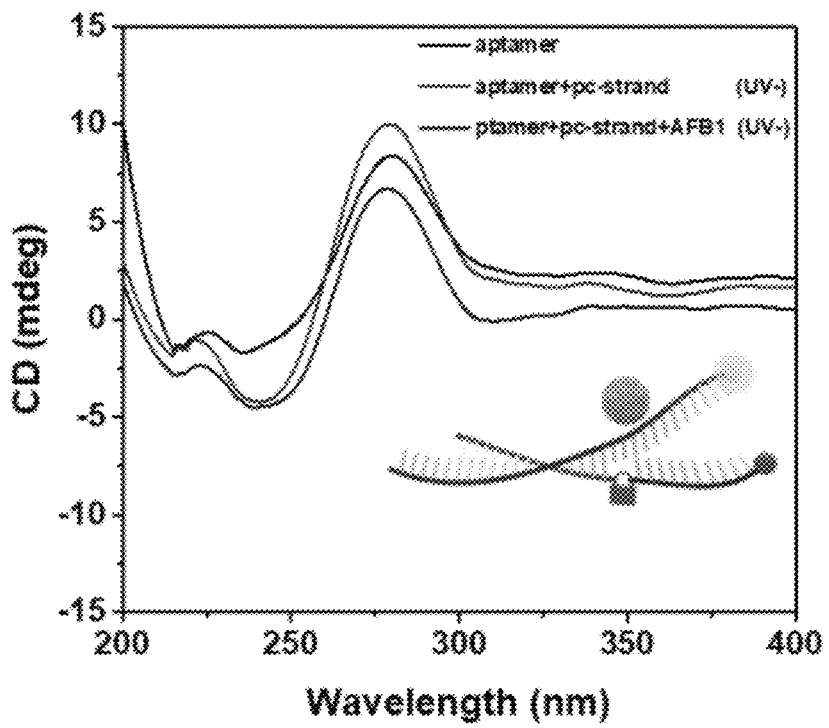
FIG. 11B illustrates a circular dichroism diagram of the aptamer, the aptamer+PC-strand and aptamer+PC-strand+AFB1 without the lighting condition according to the embodiment of the disclosure.

As shown in FIGS. 11A and 11B, in the CD diagram, a positive peak of $CD_{280\ nm}$ is a base complementary pairing peak, and a negative peak of $CD_{240\ nm}$ is a DNA spiral structure peak. After the A-PD is irradiated under the irritation intensity of 5 mW/cm$^2$, and when the concentration of the AFB1 is 100 ng/ml, the positive peak of $CD_{280\ nm}$ increases by 39.1%, and the negative peak of $CD_{240\ nm}$ decreases by 565%. When the A-PD is not irradiated with the irritation intensity of 5 mW/cm$^2$, and when the concentration of the AFB1 is 100 ng/ml, the positive peak of $CD_{280\ nm}$ decreases by 20.0%, and the negative peak of $CD_{240\ nm}$ decreases by 163.8%. The result shows that the light is more conducive to the binding of the AFB1 with the adapter, resulting in a change in configuration.

2.8 Result of Influence of the Reaction Temperature on the AFB1 Detection

Figure 12A:
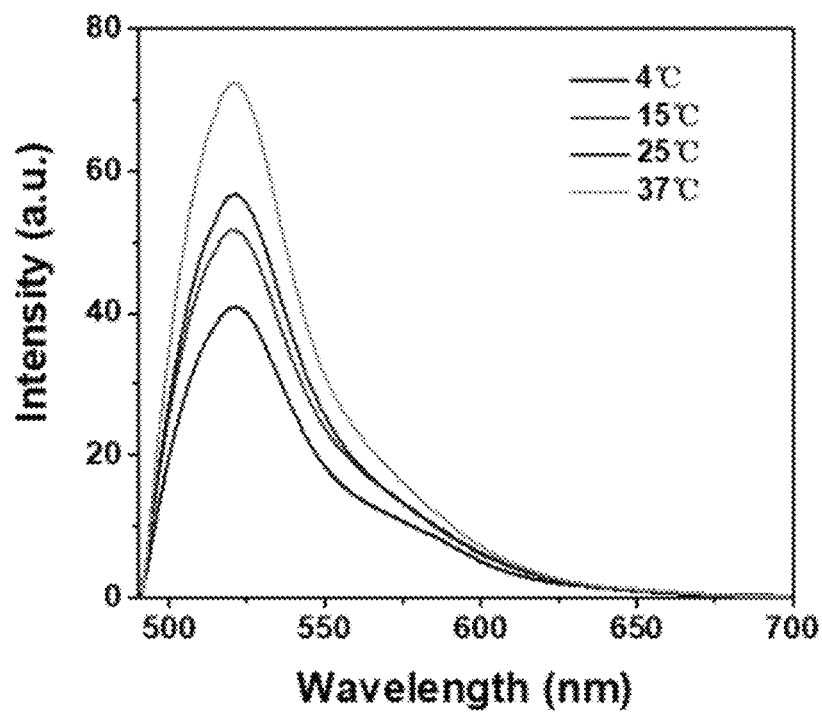
FIG. 12A illustrates a fluorescence curve diagram of an effect of a reaction temperature on the AFB1 detection according to an embodiment of the disclosure.
Figure 12B:
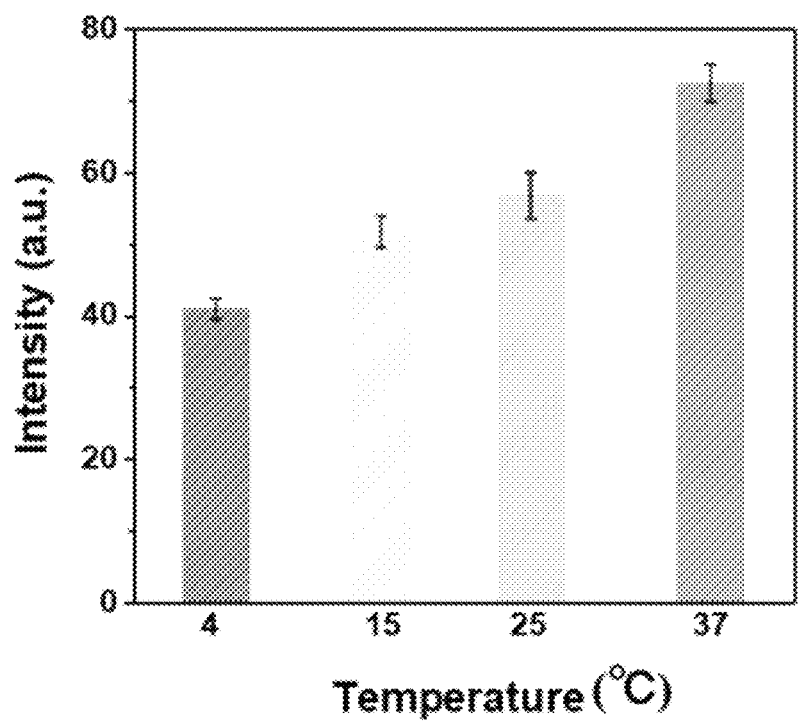
FIG. 12B illustrates a line diagram of the effect of the reaction temperature on the AFB1 detection according to the embodiment of the disclosure.

As shown in FIGS. 12A and 12B, due to the significant influence of temperature on the specific recognition of target molecules by the adapter, under the irradiation intensity of 5 mW/cm$^2$, and when the concentration of the AFB1 is 100 ng/ml, the change in the reaction temperature has a significant impact on the fluorescence intensity of the reaction system. When the reaction temperature is 37° C., the fluorescence value is the highest. Therefore, 37° C. is selected as the reaction temperature in subsequent reactions.

2.9 Experimental Result of Sensitivity of the AFB1 Detection

Figure 13A:
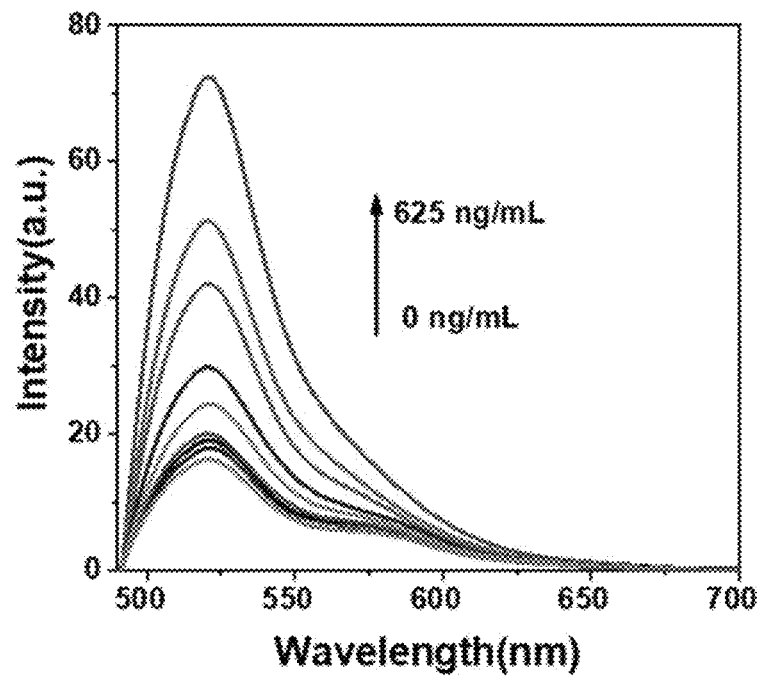
FIG. 13A illustrates a fluorescence curve diagram of a result of sensitivity of the AFB1 detection according to an embodiment of the disclosure.
Figure 13B:
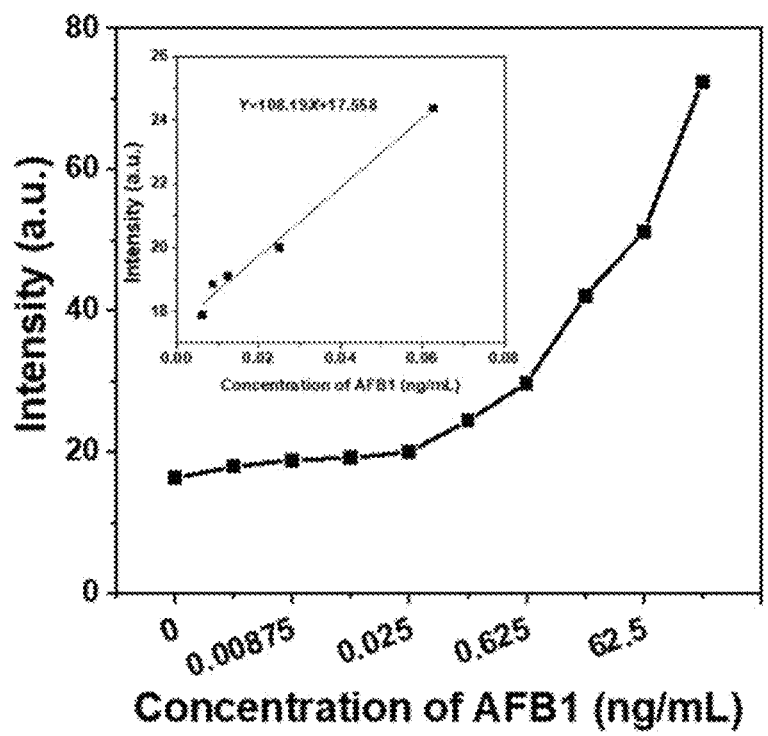
FIG. 13B illustrates a line diagram of the result of the sensitivity of the AFB1 detection according to the embodiment of the disclosure.

As shown in FIGS. 13A and 13B, the fluorescence value increases with the increase of the concentration of the AFB1 (0-625 ng/ml) after lighting for 8 min. According to the calculation of the fitted line and standard deviation in the line diagram in FIG. 13B, a limit of detection (LOD) for detection is 0.07018 ng/ml (LOD=3σ/S).

2.10 Experimental Result of Specificity of the AFB1 Detection

Figure 14A:
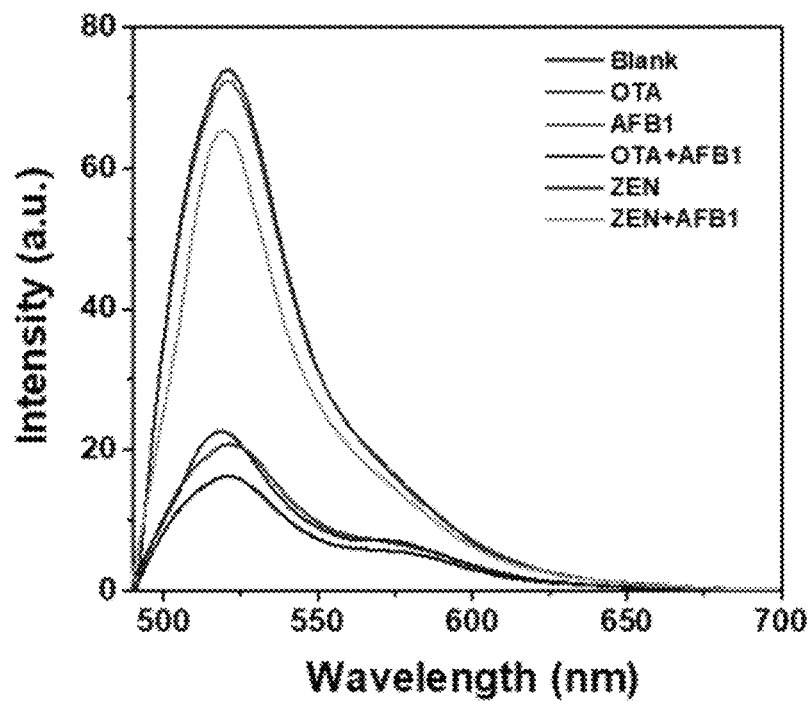
FIG. 14A illustrates a fluorescence curve diagram of a result of a specificity experiment according to an embodiment of the disclosure.
Figure 14B:
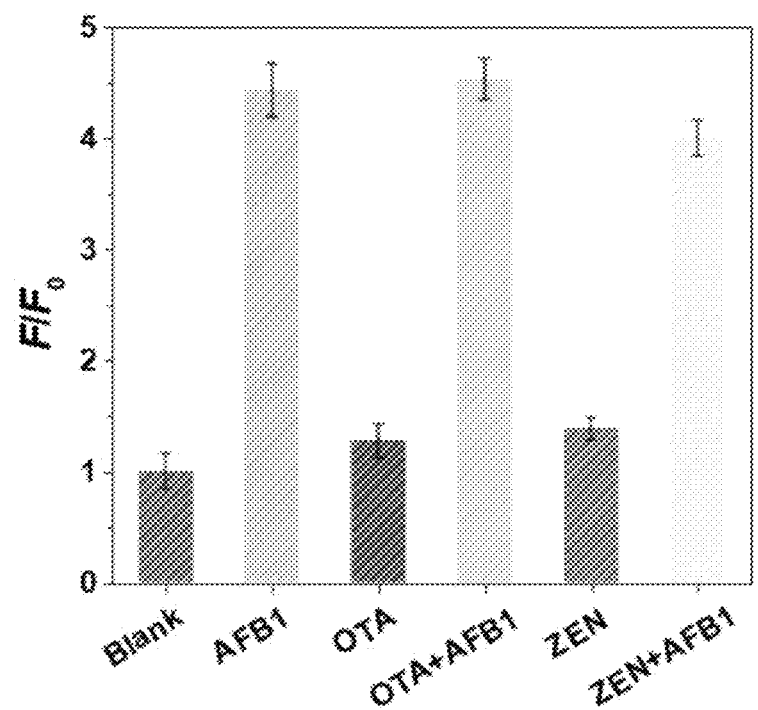
FIG. 14B illustrates a histogram of the result of the specificity experiment according to the embodiment of the disclosure.

As shown in FIGS. 14A and 14B, after lighting for 8 min, when the system exists the AFB1 (100 ng/ml), the fluorescence intensity increases by 4.4 times; and when the system exists the OTA or ZEN of the same concentration (100 ng/ml), the fluorescence intensity has hardly changed. When adding the same concentration of the AFB1, the fluorescence intensity significantly increases. The result shows that the system has a good selectivity for the AFB1.

2.11 Experimental Result of Applicability of the AFB1 Detection

Figure 15A:
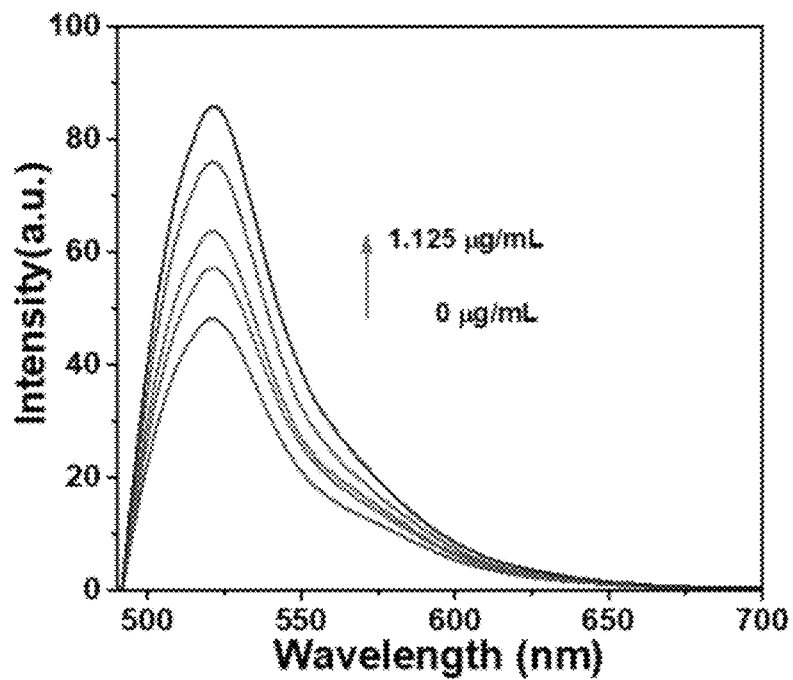
FIG. 15A illustrates a fluorescence curve diagram of a result of an application experiment in rice water according to an embodiment of the disclosure.
Figure 15B:
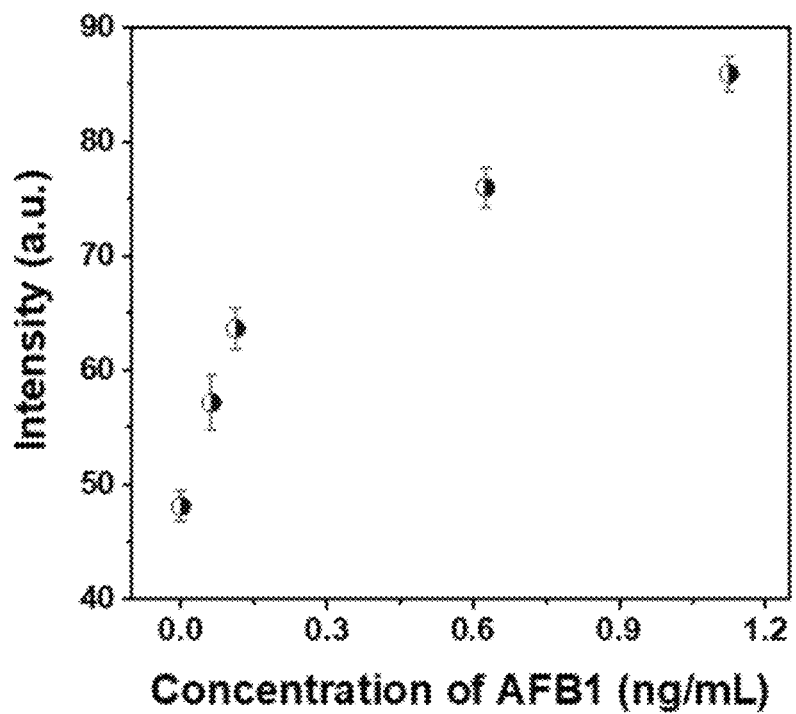
FIG. 15B illustrates a point diagram of the result of the application experiment in rice water according to the embodiment of the disclosure.

As shown in FIGS. 15A and 15B, after lighting for 8 min, when the system exists the AFB1, the fluorescence intensity enhances with the increase of the concentration of the AFB1. The result shows that the sensor has good applicability to AFB1 in rice systems.

Figure 16A:
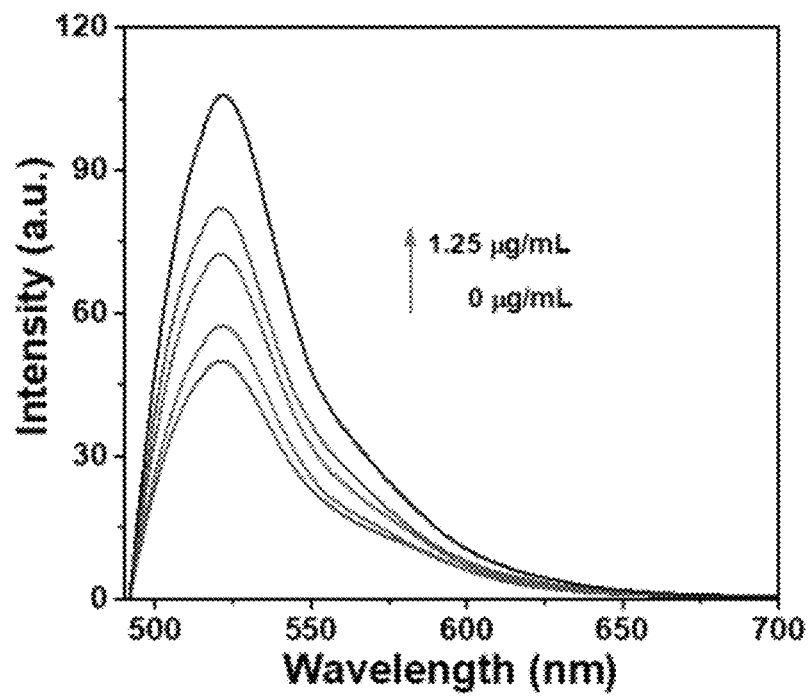
FIG. 16A illustrates a fluorescence curve diagram of a result of an application experiment in corn water according to an embodiment of the disclosure.
Figure 16B:
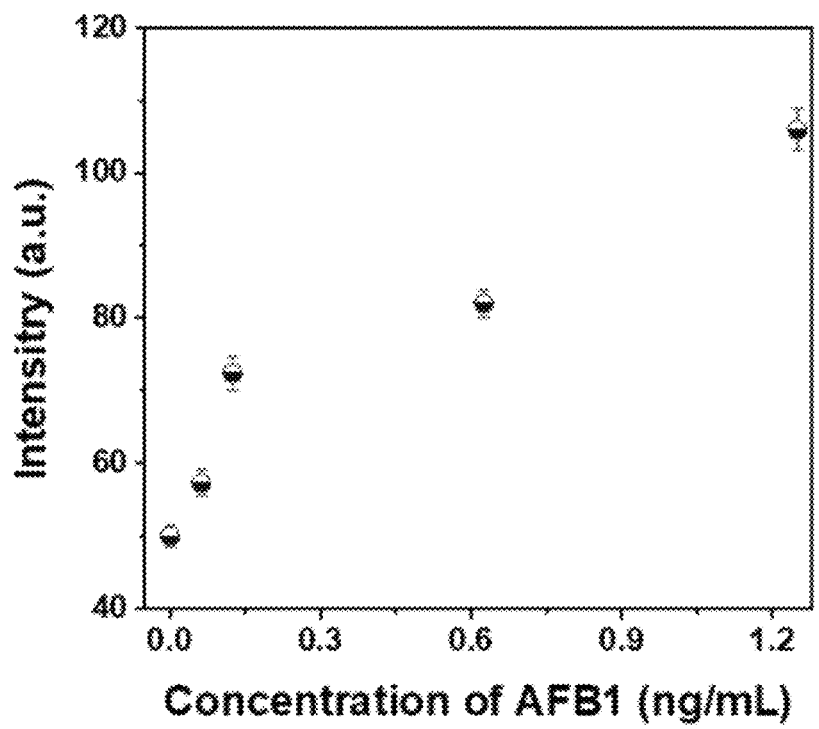
FIG. 16B illustrates a point diagram of the result of the application experiment in corn water according to the embodiment of the disclosure.

As shown in FIGS. 16A and 16B, after lighting for 8 min, when the system exists the AFB1, the fluorescence intensity enhances with the increase of the concentration of the AFB1. The result shows that the sensor has good applicability to AFB1 in corn systems.

Figure 17A:
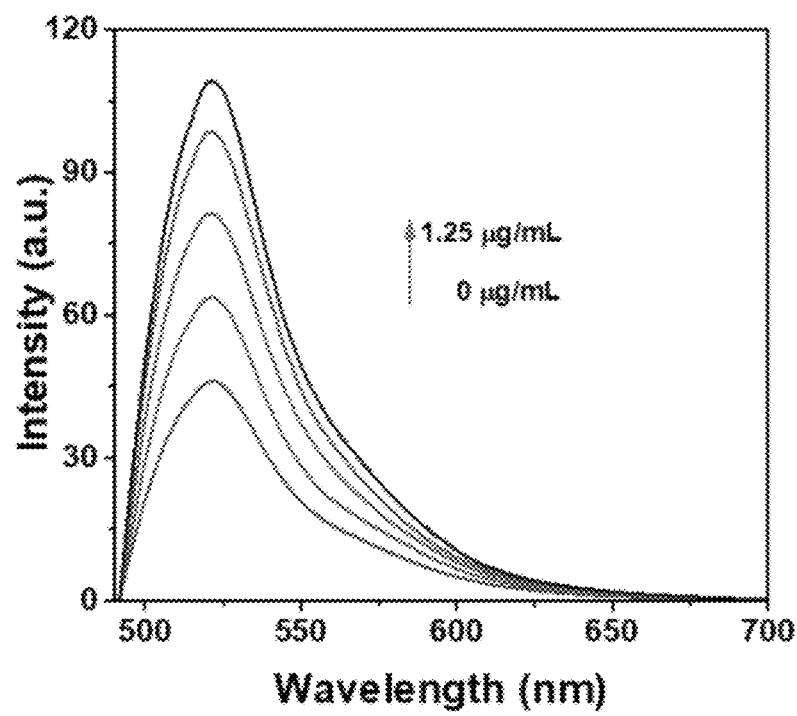
FIG. 17A illustrates a fluorescence curve diagram of a result of an application experiment in soybean water according to an embodiment of the disclosure.
Figure 17B:
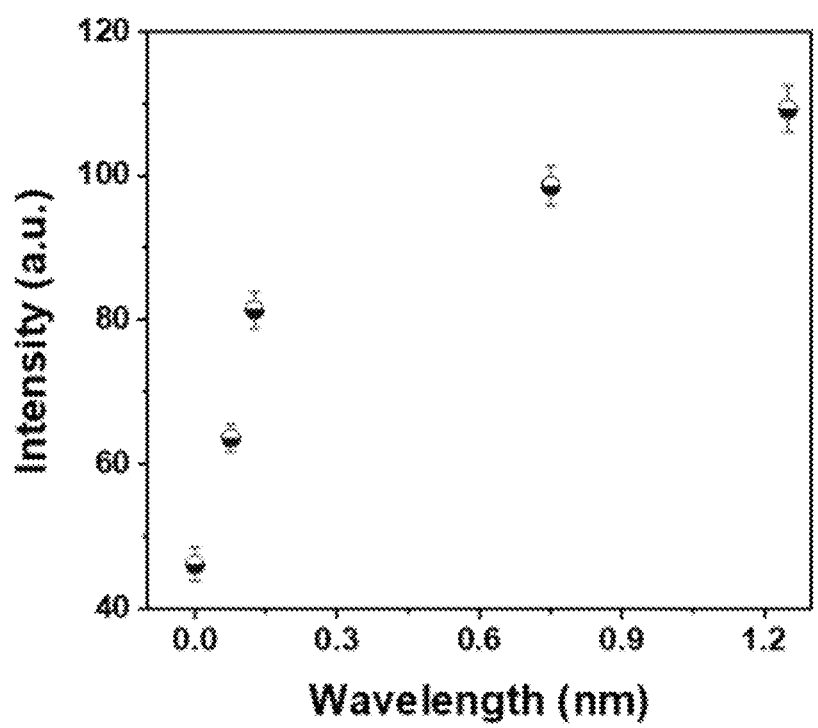
FIG. 17B illustrates a point diagram of the result of the application experiment in soybean water according to the embodiment of the disclosure.

As shown in FIGS. 17A and 17B, after lighting for 8 min, when the system exists the AFB1, the fluorescence intensity enhances with the increase of the concentration of the AFB1. The result shows that the sensor has good applicability to AFB1 in soybean systems.

In summary, the disclosure conducts a series of explorations and selects the optimal value from the experimental results. That is, the optimal concentration of the aptamer solution is 0.15 μmol/L, the optimal tris buffer solution includes 10 mM of tris, 120 mM of NaCl, 5 mM of KCl and pH=7.2, which indicates that the fluorescence quenching effect of optical sectioning on the reaction between the aptamer and the PC-strand is better. The optimal reaction temperature between the aptamer and the PC-strand is 4° C., the optimal reaction time is 20 min, and the optimal concentration ratio of the aptamer and the PC-strand is 1:1.2, which proves the feasibility of the experiment on fluorescence recovery by adding AFB1 after optical sectioning, and the optimal time for optical sectioning is 20 min. The optimal reaction temperature for AFB1 is 37° C., the sensitivity of the AFB1 detection is detected, and the sensitivity is calculated as 0.07018 ng/mL. The experimental method is applied to detect the AFB1 content in food samples such as corn, rice, soybeans and the like.

The above embodiments are merely a description of some of the embodiments of the disclosure, and do not limit the scope of the disclosure. Without departing from a design spirit of the disclosure, all variations and improvements made by those skilled in the art to the technical solution of the disclosure should fall within the scope of protection determined by claims of the disclosure.

What is claimed is:

1. A fluorescence probe combination for detecting an aflatoxin B1 (AFB1) content using a fluorescence analysis method based on optical sectioning, comprising: a fluorescence probe aptamer and a fluorescence probe PC-strand;

wherein the nucleotide sequence of the fluorescence probe aptamer is of SEQ ID NO: 1, and a carboxyfluorescein (FAM) group is located at a 3' end of the nucleotide sequence of SEQ ID NO: 1;

wherein the nucleotide sequence of the fluorescence probe PC-strand is of SEQ ID NO: 2, a tetramethylrhodamine (TAMRA) group is located at a 5' end of the nucleotide sequence of SEQ ID NO: 2, and a photocleavable (PC) group is located between $10^{th}$ base pair (bp) and $11^{th}$ bp of the nucleotide sequence of SEQ ID NO: 2; and wherein a structural formula of the PC group is following:

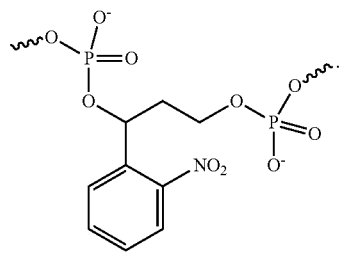

2. A kit for detecting the AFB1 content using the fluorescence analysis method based on optical sectioning, comprising the fluorescence probe combination of claim 1.

3. A method for detecting an AFB1 content using a fluorescence analysis method based on optical sectioning, comprising:

step 1, performing mixing reaction on an aptamer solution, a PC-strand solution and a tris (hydroxymethyl) aminomethane (Tris) buffer solution to obtain a mixed solution, and performing ultraviolet irradiation on the mixed solution to obtain a mixed reaction system solution;

step 2, taking a same volume of the mixed reaction system solution obtained in the step 1, adding AFB1 standard solutions with same volume but different concentrations into the same volume of the mixed reaction system solution respectively for reaction to obtain first reaction solutions, and detecting fluorescence intensities of the first reaction solutions respectively to obtain a standard curve for the AFB1 content and the fluorescence intensities; and step 3, adding a to-be-detected sample solution into the mixed reaction system solution obtained in the step 1 for reaction to obtain a second reaction solution, detecting a fluorescence intensity of the second reaction solution, and obtaining, according to the standard curve, an AFB1 content in the to-be-detected sample solution;

wherein in the step 1, the nucleotide sequence of a fluorescence probe aptamer is of SEQ ID NO: 1, and a FAM group is located at a 3' end of the nucleotide sequence of SEQ ID NO: 1; and the nucleotide sequence of a fluorescence probe PC-strand is of SEQ ID NO: 2, a TAMRA group is located at a 5' end of the nucleotide sequence of SEQ ID NO: 2, and a PC group is located between $10^{th}$ bp and $11^{th}$ bp of the nucleotide sequence of SEQ ID NO: 2;

wherein a structural formula of the PC group is following:

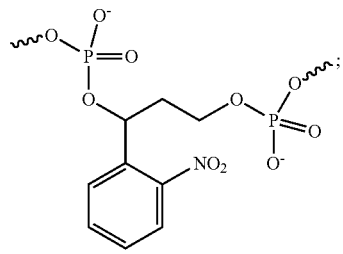

and wherein a volume ratio of the mixed reaction system solution and the to-be-detected sample solution in the step 3 is the same as a volume ratio of the mixed reaction system solution and each of the AFB1 standard solutions in the step 2.

4. The method as claimed in claim 3, wherein in the mixed solution of the aptamer solution, the PC-strand solution and the Tris buffer solution of the step 1, a concentration of the aptamer solution is 0.15 μmol/L; and a concentration of the PC-strand solution is 0.24 μmol/L.

5. The method as claimed in claim 3, wherein in the step 1, a temperature for the mixing reaction is 4° C.

6. The method as claimed in claim 3, wherein in the step 1, a radiation intensity of the ultraviolet irradiation is 5 mW/cm².

7. The method as claimed in claim 6, wherein a radiation time of the ultraviolet irradiation is 8 minutes.

8. The method as claimed in claim 3, wherein in the step 2 and the step 3, temperatures of the reaction are 37° C.

* * * * *